(12) United States Patent
Kang et al.

(10) Patent No.: US 11,133,914 B2
(45) Date of Patent: Sep. 28, 2021

(54) METHOD AND APPARATUS FOR CONFIGURING REFERENCE SIGNAL IN WIRELESS COMMUNICATION SYSTEM

(71) Applicant: Samsung Electronics Co., Ltd., Suwon-si (KR)

(72) Inventors: Jinkyu Kang, Suwon-si (KR); Younsun Kim, Suwon-si (KR); Youngbum Kim, Suwon-si (KR); Taehyoung Kim, Suwon-si (KR); Cheolkyu Shin, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2 days.

(21) Appl. No.: 16/791,365

(22) Filed: Feb. 14, 2020

(65) Prior Publication Data

US 2020/0266964 A1  Aug. 20, 2020

(30) Foreign Application Priority Data

Feb. 14, 2019  (KR) .................. 10-2019-0017264
Jan. 21, 2020  (KR) .................. 10-2020-0008082

(51) Int. Cl.
| | | |
|---|---|---|
| *H04L 5/10* | (2006.01) | |
| *H04L 5/00* | (2006.01) | |
| *H04B 1/713* | (2011.01) | |
| *H04W 80/02* | (2009.01) | |
| *H04W 72/04* | (2009.01) | |

(52) U.S. Cl.
CPC .............. *H04L 5/10* (2013.01); *H04B 1/713* (2013.01); *H04L 5/0051* (2013.01); *H04W 72/042* (2013.01); *H04W 80/02* (2013.01)

(58) Field of Classification Search
None
See application file for complete search history.

(56) References Cited

U.S. PATENT DOCUMENTS

2019/0182810 A1  6/2019  Gao et al.
2019/0342865 A1  11/2019  Shin et al.
(Continued)

FOREIGN PATENT DOCUMENTS

CN     108282879 A    7/2018
EP     3 439 218 A1   2/2019
(Continued)

OTHER PUBLICATIONS

5G; NR; Physical channels and modulation (3GPP TS 38.211 version 15.3.0 Release 15), ETSI TS 138 211 V15.3.0, Oct. 17, 2018, Sophia Antipolis, France.
(Continued)

*Primary Examiner* — Diane L Lo
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method performed by a terminal in a communication system is provided. The method includes receiving, from a base station, demodulation reference signal (DMRS) configuration information using higher layer signaling; receiving, from the base station, downlink control information for transmitting uplink data, the downlink control information including information on DMRS and resource allocation information for the uplink data; identifying a number of at least one DMRS symbol and respective position of the at least one DMRS symbol based on the infor- (Continued)

mation on DMRS and resource allocation information; and transmitting, to the base station, the uplink data and the DMRS based on the identified respective position of the at least one DMRS symbol.

16 Claims, 11 Drawing Sheets

(56) References Cited

U.S. PATENT DOCUMENTS

| | | | |
|---|---|---|---|
| 2019/0357224 A1 | 11/2019 | Li et al. | |
| 2020/0252254 A1* | 8/2020 | Hasegawa | H04W 80/08 |
| 2021/0045092 A1* | 2/2021 | Gotoh | H04W 52/247 |
| 2021/0068115 A1* | 3/2021 | Gotoh | H04W 72/04 |

FOREIGN PATENT DOCUMENTS

| | | |
|---|---|---|
| KR | 10-2018-0011022 A | 1/2018 |
| WO | 2018/024068 A1 | 2/2018 |

OTHER PUBLICATIONS

5G; NR; Physical layer procedures for data (3GPP TS 38.214 version 15.3.0 Release 15), ETSI TS 138 214 V15.3.0, Oct. 18, 2018, Sophia Antipolis, France.
International Search Report dated May 20, 2020, issued in International Application No. PCT/KR2020/002114.

* cited by examiner

METHOD AND APPARATUS FOR CONFIGURING REFERENCE SIGNAL IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0017264, filed on Feb. 14, 2019 and a Korean patent application number 10-2020-0008082, filed on Jan. 21, 2020, in the Korean Intellectual Property Office, the disclosure of each of which is incorporated by reference herein in their entireties.

BACKGROUND

1. Field

The disclosure relates to a method for configuring a demodulation reference signal (DMRS). More particularly, the disclosure relates to a reference signal by a base station or a terminal in a wireless communication system.

2. Description of Related Art

To meet the demand for wireless data traffic having increased since deployment of 4th-Generation (4G) communication systems, efforts have been made to develop an improved 5th-Generation (5G) or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

As described above, as the wireless communication system can be provided with various services, there is a demand for a method for smoothly providing such services.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for transmitting and receiving a signal for supporting non-orthogonal multiple access (NOMA) in a wireless communication system. Specifically, in this case, a method of configuring and transmitting DMRS is proposed, and the proposed disclosure is not limited to the case of NOMA transmission.

Additional aspects will be set forth in part in the description which follows and, in part, will be apparent from the description, or may be learned by practice of the presented embodiments.

In accordance with an aspect of the disclosure, a method performed by a terminal in a communication system is provided. The method includes receiving, from a base station, demodulation reference signal (DMRS) configuration information using higher layer signaling; receiving, from the base station, downlink control information for transmitting uplink data, the downlink control information including information on DMRS and resource allocation information for the uplink data; identifying a number of at least one DMRS symbol and respective position of the at least one DMRS symbol based on the information on DMRS and resource allocation information; and transmitting, to the base station, the uplink data and the DMRS based on the identified respective position of the at least one DMRS symbol In accordance with another aspect of the present disclosure, a method performed by a base station in a communication system is provided. The method includes transmitting, to a terminal, demodulation reference signal (DMRS) configuration information using higher layer signaling; identifying information on DMRS based on a number of at least one DMRS symbol, respective position of the at least one DMRS symbol and a resource for receiving uplink data;

transmitting, to the terminal, downlink control information for transmitting the uplink data, the downlink control information including the information on the DMRS and resource allocation information for the uplink data; and receiving, from the terminal, the uplink data and the DMRS based on the identified respective position of the at least one DMRS symbol.

In accordance with another aspect of the present disclosure, a base station in a communication system is provided. The base station includes a transceiver; and at least one processor configured to transmit, to a terminal via the transceiver, demodulation reference signal (DMRS) configuration information using higher layer signaling, identify information on DMRS based on a number of at least one DMRS symbol, respective position of the at least one DMRS symbol and a resource for receiving uplink data, transmit, to the terminal via the transceiver, downlink control information for transmitting the uplink data, the downlink control information including the information on the DMRS and resource allocation information for the uplink data, and receive, from the terminal via the transceiver, the uplink data and the DMRS based on the identified respective position of the at least one DMRS symbol.

In accordance with another aspect of the present disclosure, a terminal in a communication system is provided, the terminal includes a transceiver; and at least one processor configured to receive, from a base station via the transceiver, demodulation reference signal (DMRS) configuration information using higher layer signaling, receive, from the base station via the transceiver, downlink control information for transmitting uplink data, the downlink control information including information on DMRS and resource allocation information for the uplink data, identify a number of at least one DMRS symbol and respective position of the at least one DMRS symbol based on the information on DMRS and resource allocation information, and transmit, to the base station via the transceiver, the uplink data and the DMRS based on the identified respective position of the at least one DMRS symbol.

The base station or the terminal proposed in the disclosure can effectively perform channel estimation via a method of configuring a reference signal structure suitable for a transmission environment, thereby minimizing overhead of the reference signal and efficiently utilizing wireless resources.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
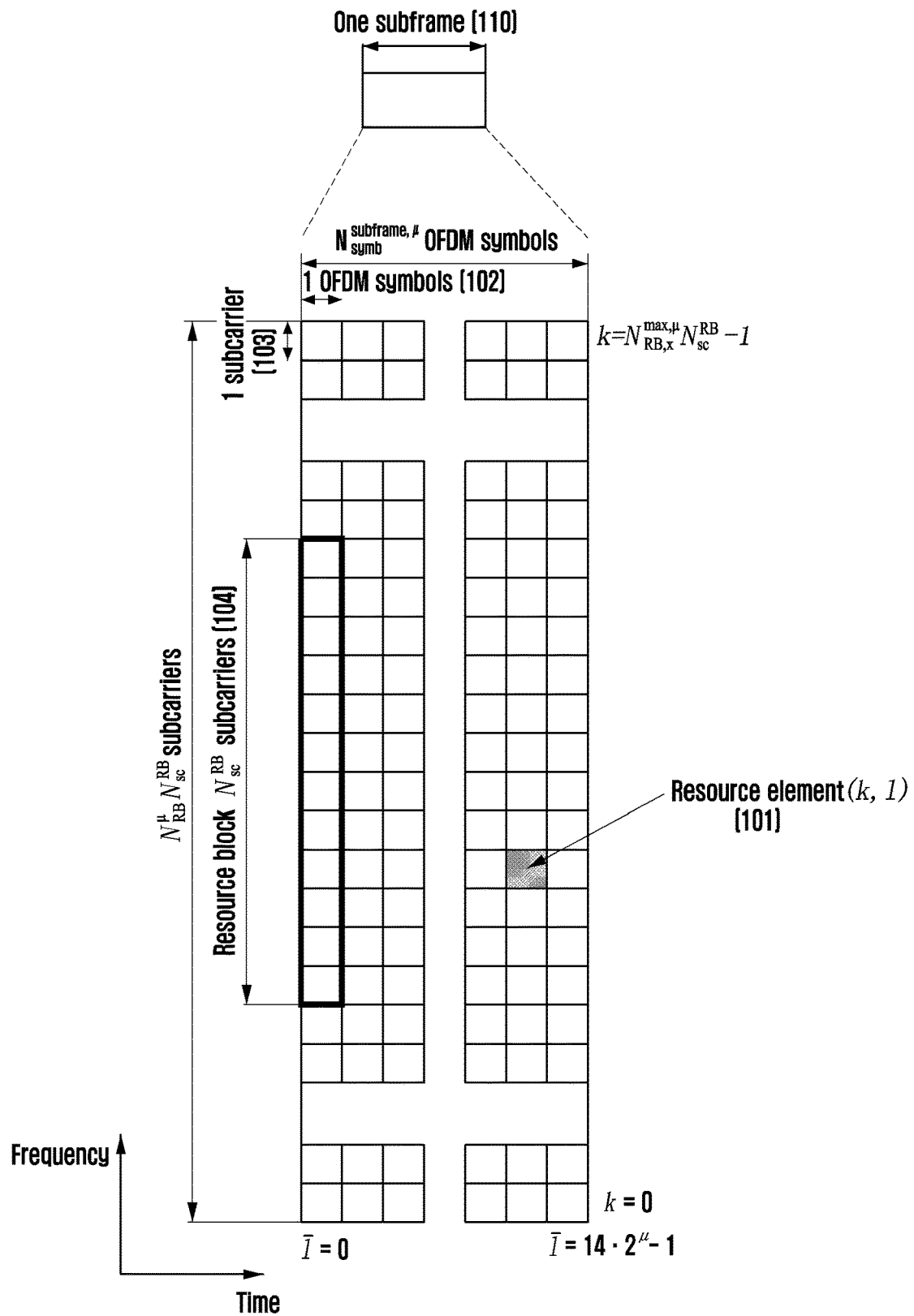
FIG. 1 is a view illustrating a basic structure of a time-frequency domain, which is a wireless resource area where data or a control channel is transmitted in a 5G system according to an embodiment of the disclosure.

The following description with reference to the accompanying drawings is provided to assist in a comprehensive understanding of various embodiments of the disclosure, as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, a base station is a subject performing resource allocation of a terminal and may be at least one of a gNode B, an eNode B, a Node B, a Base Station (BS), a wireless access unit, a base station controller, or a node on a network. The terminal may include a user equipment (UE), a mobile station (MS), a cellular phone, a smart phone, a computer, or a multimedia system capable of performing a communication function. In the disclosure, downlink (DL) is a radio transmission path of a signal transmitted from a base station to a terminal, and uplink (UL) is a radio transmission path of a signal transmitted from a terminal to a base station. In addition, although an LTE or LTE-A system may be described below as an example, embodiments of the disclosure may be applied to other communication systems having a similar technical background or channel form. For example, this may include a fifth generation mobile communication technology (5G, new radio, NR) developed after LTE-A, and the following 5G may be a concept including existing LTE, LTE-A and other similar services. In addition, the disclosure may be applied to other communication systems via some modifications without departing from the scope of the disclosure as determined by those skilled in the art.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational to be performed on the computer or other programmable apparatus to produce a computer implemented process such that the instructions that execute on the computer or other programmable apparatus provide operation for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term '-unit' used in the embodiments refers to software or a hardware component such as a field programmable gate array (FPGA) or an application specific integrated circuit (ASIC), and '-unit' plays a role. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card. In an embodiment, '-unit' may include one or more processors.

The wireless communication system has evolved from providing an initial voice-oriented service to a broadband wireless communication system providing a high-speed, high-quality packet data service, for example, communication standards such as high speed packet access (HSPA), long term evolution (LTE) or evolved universal terrestrial radio access (E-UTRA), LTE-advanced (LTE-A), LTE-Pro of 3GPP, high rate packet data (HRPD), ultra-mobile broadband (UMB) of 3GPP2, and IEEE's 802.16e, and the like.

As a representative example of a broadband wireless communication system, an LTE system adopts an orthogonal frequency division multiplexing (OFDM) scheme in downlink (DL) and adopts a single carrier frequency division multiple access (SC-FDMA) in uplink (UL). The UL refers to a radio link through which a terminal (user equipment (UE) or a mobile station (MS)) transmits data or a control signal to a base station (eNode B, or gNode B), and the downlink refers to a radio link through which a base station transmits data or a control signal to a terminal. In addition, in the above-described multiple access scheme, the data or control information of each user is distinguished by allocating and operating the time-frequency resources to carry data or control information for each user so as not to overlap each other, that is, to establish orthogonality.

Since a 5G communication system, which is a communication system after LTE, should be able to freely reflect various requirements of users and service providers, services that meet the various requirements should also be supported. The services considered for a 5G communication system may include enhanced Mobile Broadband (eMBB) communication, massive machine type communication (mMTC), ultra-reliability low latency communication (URLLC), and the like.

The eMBB aims to provide a higher data rate than the data rate supported by LTE, LTE-A, or LTE-Pro. For example, in a 5G communication system, the eMBB should be able to provide a peak data rate of 20 Gbps in downlink and a peak data rate of 10 Gbps in uplink from the viewpoint of one base station. In addition, the 5G communication system should provide the peak data rate, and at the same time provide the user perceived data rate of the terminal. In order to meet such requirements, improvements in various transmission and reception techniques may be required, including more advanced multi input multi output (MIMO) transmission techniques. In addition, in the LTE system, signals are transmitted using a maximum bandwidth of 20 MHz in a 2 GHz band, while in a 5G communication system, a frequency bandwidth wider than 20 MHz is used in a frequency band of 3 to 6 GHz or 6 GHz or more, thereby satisfying the data rate required in a 5G communication system.

At the same time, mMTC is being considered to support application services such as the Internet of Things (IoT) in 5G communication systems. In order to efficiently provide IoT, the mMTC requires the support of large terminal access in the cell, improved terminal coverage, improved battery time, and reduced terminal cost, and the like. Since the IoT is attached to various sensors and various devices to provide a communication function, it should be able to support a large number of terminals (e.g., 1,000,000 terminals/km$^2$) in a cell. In addition, the terminal supporting the mMTC is likely to be located in a shadow area that the cell does not cover, such as the basement of a building because of the nature of the service requires more coverage than other services provided by the 5G communication system. The terminal supporting the mMTC should be configured as a low-cost terminal, and because it is difficult to replace a battery of the terminal frequently, a very long battery life time such as 10~15 years is required.

Finally, in the case of URLLC, it is a cellular-based wireless communication service used mission-critically. For example, a service used to remotely control robots, machinery, industrial automation, unmanned aerial vehicles, remote health care, emergency alerts, etc. may be considered. Therefore, the communication provided by URLLC should provide very low latency and very high reliability. For example, a service that supports URLLC should meet air interface latency of less than 0.5 milliseconds and at the same time meet the requirements of packet error rate of 10-5 or less. Therefore, for services supporting URLLC, 5G systems should provide a smaller transmit time interval (TTI) than over services, and simultaneously allocate a wider resource in the frequency band to ensure the reliability of the communication link.

Three services of 5G, that is, eMBB, URLLC, and mMTC may be multiplexed and transmitted in one system. At this time, in order to satisfy different requirements of respective services, different transmission/reception techniques and transmission/reception parameters may be used between services.

Hereinafter, the frame structure of the 5G system will be described in more detail with reference to the accompanying drawings.

FIG. 1 is a view illustrating a basic structure of a time-frequency domain, which is a wireless resource area in which data or a control channel is transmitted in a 5G system according to an embodiment of the disclosure.

Referring to FIG. 1, the horizontal axis represents the time domain, and the vertical axis represents the frequency domain. The basic unit of resources in the time and frequency domains is a resource element (RE) 101, which may be defined with one orthogonal frequency division multiplexing (OFDM) symbol 102 on the time axis and one subcarrier 103 on the frequency axis. The $N_{sc}^{RB}$ (e.g., 12) consecutive REs in the frequency domain may constitute one resource block (RB) 104. In addition, the consecutive $N_{slot}^{subframe}$ OFDM symbols in the time domain may constitute one subframe 110.

Figure 2:
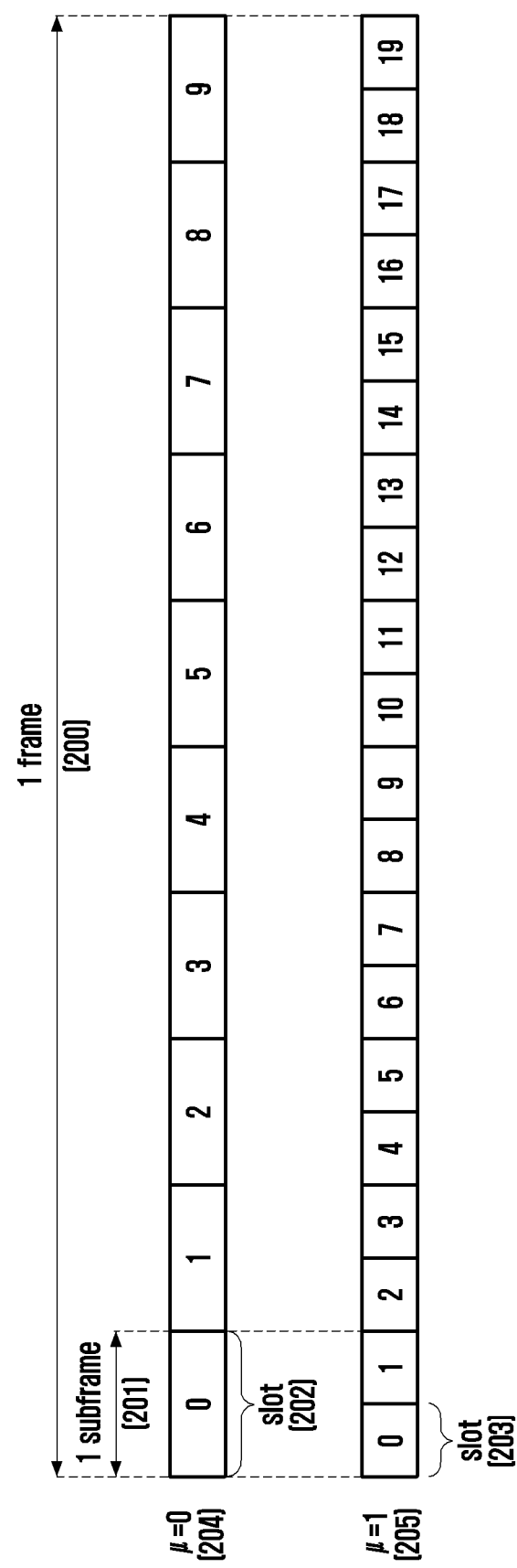
FIG. 2 is a view illustrating a slot structure considered in a 5G system according to an embodiment of the disclosure.

FIG. 2 is a view illustrating a slot structure considered in a 5G system according to an embodiment of the disclosure.

Referring to FIG. 2 illustrates an example of a structure of a frame 200, subframe 201, and a slot 202. One frame 200 may be defined as 10 ms. One subframe 201 may be defined as 1 ms, and thus, one frame 200 may be configured as a total of 10 subframes 201. In addition, one slot 202 or 203 may be defined as 14 OFDM symbols (that is, the number of symbols per slot ($N_{slot}^{subframe}$) is 14). One subframe 201 may be composed of one or multiple slots 202 and 203, and the number of the slots 202 and 203 per subframe may vary depending on the configuration value μ204 and 205 for the subcarrier spacing. In the sample of FIG. 2, a slot structure in the case where μ=0 (204) and μ=1 (205) is illustrated as a subcarrier spacing configuration value. In the case of μ=0 (204), one subframe 201 may include one slot 202, and in the case of μ=1 (205), one subframe 201 may include two slots 203. That is, the number of slots per subframe slot $N_{slot}^{subframe,\mu}$ may vary depending on the configuration value μ for the subcarrier spacing, and in accordance with this, the number of slots per frame $N_{slot}^{frame,\mu}$ may vary. The $N_{slot}^{subframe,\mu}$ and $N_{slot}^{frame,\mu}$ according to each subcarrier spacing configuration μ may be defined in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |

TABLE 1-continued

| μ | $N_{symb}^{slot}$ | $N_{slot}^{frame,\mu}$ | $N_{slot}^{subframe,\mu}$ |
|---|---|---|---|
| 2 | 14 | 40 | 4 |
| 3 | 14 | 80 | 8 |
| 4 | 14 | 160 | 16 |
| 5 | 14 | 320 | 32 |

Next, demodulation reference signal (DMRS) which is one of the reference signals in the 5G system will be described in detail.

The DMRS described below refers to a reference signal that is transmitted by applying terminal-specific precoding to a reference signal so that the terminal can perform demodulation without additionally receiving precoding information. The DMRS may be composed of several DMRS ports, and each port maintains orthogonality so as not to interface with each other using CDM or FDM. However, the term for DMRS may be expressed as other terms depending on the intention of the user and the purpose of using the reference signal. More specifically, the term DMRS is only intended to provide a specific example to easily explain the technical content of the disclosure and help the understanding of the disclosure, and is not intended to limit the scope of the disclosure. That is, it will be apparent to those skilled in the art that the disclosure can be applied to a reference signal based on the technical idea of the disclosure.

Figure 3:
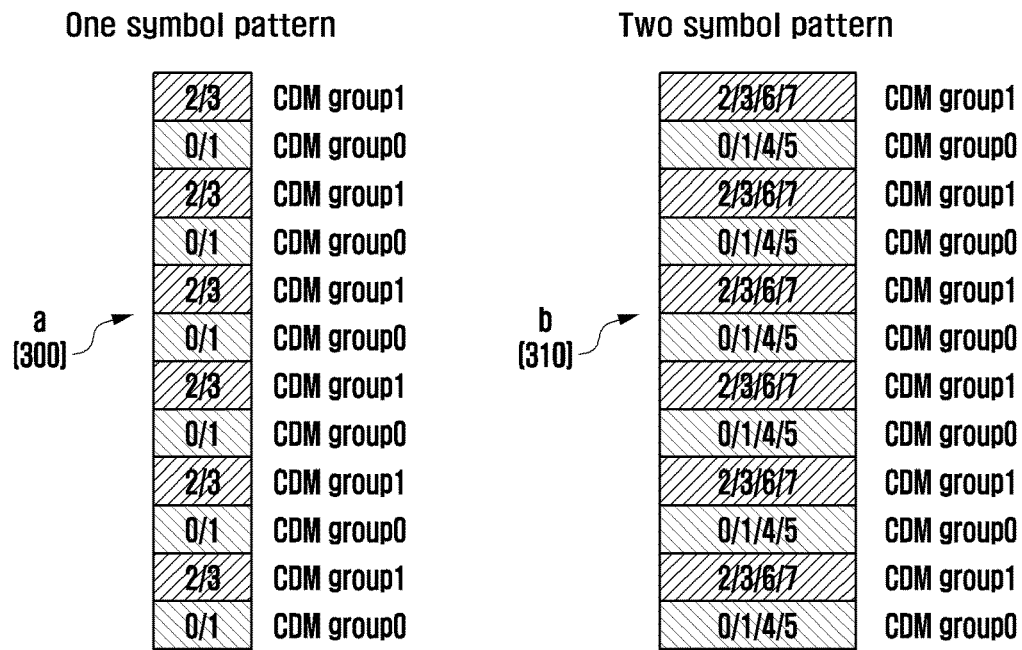
FIG. 3 is a view explaining DMRS patterns (type 1 and type 2) used for communication between a base station and a terminal in a 5G system according to an embodiment of the disclosure.
Figure 3:
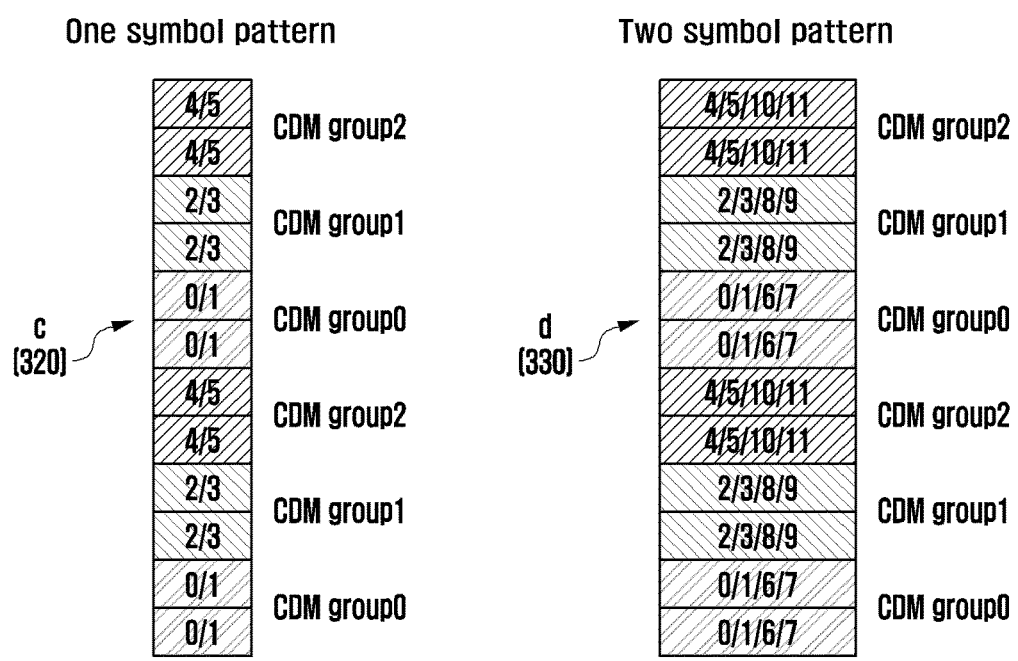
Figure 3:
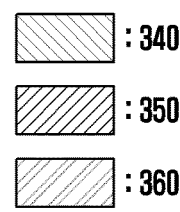

FIG. 3 is a view explaining DMRS patterns (type 1 and type 2) used for communication between a base station and a terminal in a 5G system. In the NR system, two DMRS patterns are supported according to an embodiment of the disclosure. Two DMRS patterns are specifically illustrated in FIG. 3.

Referring to FIG. 3, reference numerals a 300 and b 310 denote DMRS type 1, reference numeral a 300 denotes 1 symbol pattern, and reference numeral b 310 denotes 2 symbol pattern. The DMRS type 1 of a 300 and b 310 is a DMRS pattern of a comb 2 structure and may be composed of two code division multiplexing (CDM) groups, and different CDM groups are frequency division multiplexed (FDMed). In more detail, in a 300 and b 310, the portions corresponding to reference numeral 340 are CDM group 0 and the portions corresponding to reference numeral 350 are CDM group 1. In the 1 symbol pattern of a 300, two DMRS ports may be distinguished by applying a CDM in frequency to the same CDM group. Accordingly, a total of four orthogonal DMRS ports may be configured in a 300. The DMRS port IDs mapped to the CDM groups are shown in a 300 (in the case of the downlink, the DMRS port IDs are indicated by being +1000 with the number shown). In the 2 symbol pattern of b 310, four DMRS ports may be distinguished by applying CDM in time and frequency to the same CDM group, and thus a total of eight orthogonal DMRS port can be configured. The DMRS port IDs respectively mapped to a CDM group are shown in b 310 (in the case of the downlink, the DMRS port IDs are indicated by being +1000 with the number shown).

On the contrary, DMRS type2 of c 320 and d 330 is a DMRS pattern having a structure of applying a frequency domain-orthogonal cover code (FD-OCC) to adjacent subcarriers in frequency, and may be composed of three CDM groups, and different CDM groups are FDMed. In more detail, in c 320 and d 330, the portions corresponding to a reference numeral 360 are CDM group 0, the portions corresponding to a reference numeral 340 are CDM group 1, and the portions corresponding to a reference numeral 350 are CDM group 2. In the 1 symbol pattern of c 320, two DMRS ports may be distinguished by applying a CDM on frequency to the same CDM group. Accordingly, a total of six orthogonal DMRS ports may be configured. The DMRS port IDs respectively mapped to the CDM groups are shown in c 320 (in the case of the downlink, the DMRS port IDs are indicated by being +1000 with the number shown). In the 2 symbol pattern of d 330, four DMRS ports may be distinguished by applying CDM on time and frequency to the same CDM group, and thus a total of twelve orthogonal DMRS ports may be configured. The DMRS port IDs respectively mapped to the CDM groups are shown in d 330 (in the case of the downlink, the DMRS port IDs are indicated by being +1000 with the number shown).

As described above, in the NR system, two different DMRS patterns (a 300 and b 310 or c 320 and d 330) may be configured, and whether the DMRS pattern is one symbol pattern (a 300 and c 320) or an adjacent two symbol pattern (b 310 and d 330) may also be configured. In addition, a base station may not only schedule the DMRS port number but also configure and perform signaling the number of CDM groups scheduled together for PDSCH rate matching. In the case of CP-OFDM, both the above-described DMRS patterns are supported in DL and UL, and in the case of DFT-S-OFDM, only DMRS type 1 is supported in the above-described DMRS patterns in UL.

In addition, an additional DMRS can be configured. A front-loaded DMRS refers to a first DMRS that appears in the frontmost symbol in time, and an addition DMRS refers to the DMRS that appears in the symbol after the front-loaded DMRS. In the NR system, the number of additional DMRSs can be configured from a minimum of 0 to a maximum of 3. In addition, the same pattern as the front-loaded DMRS is assumed when additional DMRSs are configured. More specifically, if information on whether the DMRS pattern type 1 or type2 described above is used for front-loaded DMRS, information on whether the DMRS pattern is a one symbol pattern or two adjacent symbol patterns, and information on the number of CDM groups used with the DMRS port is indicated, and when an additional DMRS is additionally configured, the additional DMRS is configured with DMRS information in the same manner as the front-loaded DMRS.

More specifically, the downlink DMRS and uplink DMRS configurations described above may be configured via an RRC signal of Tables 2 and 3 below.

TABLE 2

DMRS-DownlinkConfig::=SEQUENCE {DMRS-Type (DMRS type configuration) ENUMERATED {type2} OPTIONAL, -- Need S
   dmrs-AdditionalPosition (additional DMRS OFDM symbol configuration) ENUMERATED {pos0, pos1, pos3} OPTIONAL, -- Need S
   maxLength (1 symbol or 2symbol DMRS pattern related configuration) ENUMERATED {len2} OPTIONAL, -- Need S
   scramblingID0 (scrambling ID0) INTEGER (0..65535) OPTIONAL, -- Need S
   scramblingID1 (scrambling ID1) INTEGER (0..65535) OPTIONAL, -- Need S
   phaseTrackingRS (PTRS configuration) SetupRelease { PTRS-DownlinkConfig } OPTIONAL, -- Need M
...}

TABLE 3

DMRS-UplinkConfig::= SEQUENCE {
   dmrs-Type (DMRS type configuration) ENUMERATED {type2} OPTIONAL, -- Need S
   dmrs-AdditionalPosition (Additional DMRS OFDM symbol configuration) ENUMERATED {pos0, pos1, pos3} OPTIONAL, --Need R
   phaseTrackingRS (PTRS configuration) SetupRelease { PTRS-UplinkConfig } OPTIONAL, -- Need M
   maxLength (1 symbol or 2symbol DMRS pattern related configuration) ENUMERATED {len2} OPTIONAL, -- Need S
   transformPrecodingDisabled SEQUENCE{
     scramblingID0 (Scrambling ID0) INTEGER (0..65535) OPTIONAL, -- Need S
     scramblingID1 (Scrambling ID0) INTEGER (0..65535) OPTIONAL, -- Need S
     ...
   } OPTIONAL, -- Need R
   transformPrecodingEnabled SEQUENCE {
     nPUSCH-Identity (Cell ID for DFT-s-OFDM) INTEGER(0..1007) OPTIONAL, -- Need S
     sequenceGroupHopping (Sequence group hopping) ENUMERATED {disabled} OPTIONAL, -- Need S
     sequenceHopping (Sequence hopping) ENUMERATED {enabled} OPTIONAL, -- Need S TABLE 3-continued

| sequenceHopping (sequence hopping) OPTIONAL, -- Need S | ENUMERATED {enabled} |
|---|---|
| ... } | OPTIONAL, -- Need R |
| } |  |

Next, downlink control information (DCI) in the 5G system will be described in detail.

Scheduling information on uplink data (or physical uplink shared channel (PUSCH)) or downlink data (or physical downlink shared channel (PDSCH)) in a 5G system may be delivered from a base station to a terminal via DCI. The terminal may monitor the DCI format for fallback and the DCI format for non-fallback with respect to the PUSCH or PDSCH. The fallback DCI format may be configured with a fixed field selected between the base station and the terminal, and the non-fallback DCI format may include a configurable field.

The DCI may be transmitted via a physical downlink control channel (PDCCH) which is a physical downlink control channel via channel coding and modulation. A cyclic redundancy check (CRC) may be attached to the DCI message payload, and the CRC may be scrambled with a radio network temporary identifier (RNTI) corresponding to the identity of the terminal According to the purpose of the DCI, for example, terminal-specific data transmission, power control command, or random access response, different RNTIs may be used. That is, the RNTI may be included in a CRC calculation process and transmitted without being explicitly transmitted. When the terminal receives the DCI message transmitted on the PDCCH, the terminal identifies the CRC using the allocated RNTI, and if the CRC identification result is correct, the terminal may know that the message is transmitted to the terminal.

For example, the DCI scheduling the PDSCH for system information (SI) may be scrambled with the SI-RNTI. The DCI scheduling the PDSCH for the RAR message may be scrambled with the RA-RNTI. The DCI scheduling the PDSCH for the paging message may be scrambled with the P-RNTI. The DCI notifying the slot format indicator (SFI) may be scrambled with the SFI-RNTI. The DCI notifying transmission power control (TPC) may be scrambled with the TPC-RNTI. The DCI scheduling terminal-specific PDSCH or PUSCH may be scrambled with cell RNTI (C-RNTI).

DCI format 0_0 may be used as a fallback DCI scheduling a PUSCH, where the CRC may be scrambled with C-RNTI. DCI format 0_0 in which CRC is scrambled with C-RNTI may include, for example, the information of Table 4 below.

TABLE 4

- Identifier for DCI formats - [1] bit
- Frequency domain resource assignment -
  [ ⌈$\log_2(N_{RB}^{UL,BWP}(N_{RB}^{UL,BWP}+1)/2)$⌉ ] bits
  - Time domain resource assignment - X bits
  - Frequency hopping flag - 1 bit.
  - Modulation and coding scheme - 5 bits
  - New data indicator - 1 bit
  - Redundancy version - 2 bits
  - HARQ process number - 4 bits
  - TPC command for scheduled PUSCH - [2] bits
- UL/SUL indicator - 0 or 1 bit The DCI format 0_1 may be used as a non-fallback DCI for scheduling PUSCH, and at this time, CRC may be scrambled with C_RNTI. The DCI format 0_1 in which CRC is scrambled with C-RNTI may include, for example, the information of Table 5 below.

TABLE 5

Carrier indicator-0 or 3 bits
   UL/SUL indicator-0 or 1 bit
   Identifier for DCI formats-[1] bits
   Bandwidth part indicator-0, 1 or 2 bits
   Frequency domain resource assignment
   For resource allocation type 0, ⌈$N_{RB}^{UL,BWP}/P$⌉ bits
   For resource allocation type 1, ⌈$\log_2(N_{RB}^{UL,BWP}(N_{RB}^{UL,BWP}+1)/2)$⌉ bits
   Time domain resource assignment-1, 2, 3, or 4 bits
   VRB-to-PRB mapping-0 or 1 bit, only for resource allocation type 1.
   0 bits if only resource allocation type 0 is configured;
   1 bit otherwise.
     Frequency hopping flag-0 or 1 bit, only for resource allocation type 1.
   0 bits if only resource allocation type 0 is configured;
   1 bit otherwise.
     Modulation and coding scheme-5 bits
     New data indicator -1 bit
     Redundancy version-2 bits
     HARQ process number-4 bits
     1st downlink assignment index-1 or 2 bits
   1 bit for semi-static HARQ-ACK codebook;
   2 bits for dynamic HARQ-ACK codebook with single HARQ-ACK codebook
     2nd downlink assignment index-0 or 2 bits
   2 bits for dynamic HARQ-ACK codebook with two HARQ-ACK sub-codebooks;
   0 bits otherwise.
     TPC command for scheduled PUSCH-2 bits
     SRS resource indicator- $$\left\lfloor \log_2\left(\sum_{k=1}^{L_{max}} \binom{N_{SRS}}{k}\right)\right\rfloor \text{ or } \lceil \log_2(N_{SRS}) \rceil \text{ bits}$$

$$\left\lfloor \log_2\left(\sum_{k=1}^{L_{max}} \binom{N_{SRS}}{k}\right)\right\rfloor$$

bits for non-codebook based PUSCH transmission;
⌈$\log_2(N_{SRS})$⌉ bits for codebook based PUSCH transmission
   Precoding information and number of layers-up to 6 bits TABLE 5-continued Antenna ports-up to 5 bits
SRS request-2 bits
CSI request-0, 1, 2, 3, 4, 5, or 6 bits
CBG transmission information-0, 2, 4, 6, or 8 bits
PTRS-DMRS association-0 or 2 bits.
beta_offset indicator-0 or 2 bits
DMRS sequence initialization-0 or 1 bit The DCI format 1_0 may be used as a fallback DCI for scheduling PDSCH, and at this time, CRC may be scrambled with C_RNTI. The DCI format 1_0 in which CRC is scrambled with C-RNTI may include, for example, the information of Table 6 below.

TABLE 6

- Identifier for DCI formats - [1] bit
- Frequency domain resource assignment
 [ [ $\log_2(N_{RB}^{DL,\,BWP}\,(N_{RB}^{DL,\,BWP}+1)/2)$ ] ] bits
- Time domain resource assignment - X bits
- VRB-to-PRB mapping - 1 bit
- Modulation and coding scheme - 5 bits
- New data indicator - 1 bit
- Redundancy version - 2 bits
- HARQ process number - 4 bits
- Downlink assignment index - 2 bits
- TPC command for scheduled PUCCH - [2] bits
- PUCCH resource indicator - 3 bits
- PDSCH-to-HARQ feedback timing indicator - [3] bits The DCI format 1_1 may be used as a non-fallback DCI for scheduling PDSCH, and at this time, CRC may be scrambled with C_RNTI. The DCI format 1_1 in which CRC is scrambled with C-RNTI may include, for example, the information of Table 7 below.

TABLE 7

- Carrier indicator - 0 or 3 bits
- Identifier for DCI formats - [1] bits
- Bandwidth part indicator - 0, 1 or 2 bits
- Frequency domain resource assignment
 ○ For resource allocation type 0, [ $N_{RB}^{DL,\,BWP}$/P ] bits
 ○ For resource allocation type 1, [ $\log_2(N_{RB}^{DL,\,BWP}\,(N_{RB}^{DL,\,BWP}+1)/2)$ ] bits
   - Time domain resource assignment - 1, 2, 3, or 4 bits
   - VRB-to-PRB mapping - 0 or 1 bit, only for resource allocation type 1.
 ○ 0 bits if only resource allocation type 0 is configured;
 ○ 1 bit otherwise.
   - PRB bundling size indicator - 0 or 1 bit
   - Rate matching indicator - 0, 1, or 2 bits
   - ZP CSI-RS trigger - 0, 1, or 2 bits
   For transport block 1:
   - Modulation and coding scheme - 5 bits
   - New data indicator - 1 bit
   - Redundancy version - 2 bits
   For transport block 2:
   - Modulation and coding scheme - 5 bits
   - New data indicator - 1 bit
   - Redundancy version - 2 bits
   - HARQ process number - 4 bits
   - Downlink assignment index - 0 or 2 or 4 bits
   - TPC command for scheduled PUCCH - 2 bits
   - PUCCH resource indicator - 3 bits
   - PDSCH-to-HARQ_feedback timing indicator - 3 bits
   - Antenna ports - 4, 5 or 6 bits
   - Transmission configuration indication - 0 or 3 bits
   - SRS request - 2 bits
   - CBG transmission information - 0, 2, 4, 6, or 8 bits
   - CBG flushing out information - 0 or 1 bit
   - DMRS sequence initialization - 1 bit Hereinafter, embodiments of the disclosure will be described in detail with the accompanying drawings. Hereinafter, embodiments of the disclosure will be described as an example of a 5G wireless communication system, but the embodiments of the disclosure may be applied to other communication systems having a similar technical background or channel form. Embodiments of the disclosure may be applied not only to 5G communication systems but also to LTE and LTE-A or communication systems after 5G. In addition, the embodiments of the disclosure may be applied to other communication systems through some modifications without departing from the scope of the disclosure by the judgment of those skilled in the art.

In description the disclosure, when it is determined that a detailed description of a related function or configuration may unnecessarily obscure the subject matter of the disclosure, the detailed description thereof will be omitted. Terms to be described later are terms defined in consideration of functions in the disclosure and may be changed according to intentions or customs of users or operators. Therefore, the definition should be made based on the contents throughout the specification.

First Embodiment

In the first embodiment of the disclosure, a method of configuring, by a base station, the number of OFDM symbols of DMRS, which is a reference signal, will be described. In the 5G system, a DMRS structure may be changed according to the transmission environment, and the overhead of the reference signal may be optimized according to the transmission environment. More specifically, in a low SNR or high speed environment, it is necessary to configure a large number of OFDM symbols to be used as DMRS to improve channel estimation performance. On the contrary, in high SNR or low speed environments, it is necessary to use a small number of OFDM symbols in the DMRS to improve the transmission efficiency by reducing the reference signal overhead. As such, when the reference signal is adaptively transmitted to the transmission environment, the overhead of unnecessary reference signals can be minimized to maximize the performance of the system.

As described above, the number of OFDM symbols of the DMRS can be configured semi-statically via higher layer signaling (i.e., RRC signaling). However, when the transmission environment is dynamically changed or when the terminal exists at the cell edge, the terminal may not receive the RRC signaling because the RRC signaling is transmitted by being included in a data channel having a lower coverage than the control channel Therefore, the number of OFDM symbols of the DMRS needs to be dynamically configured with L1 signaling (i.e., DCI signaling) transmitted via the control channel. Accordingly, an embodiment of the disclosure proposes a method for dynamically configuring the number of OFDM symbols of the DMRS that is a reference signal by L1 signaling.

The following methods may be considered as methods of configuring the number and position of OFDM symbols of the DMRS.

Method 1

A base station may explicitly configure the number of uplink DMRS OFDM symbols to a terminal using a new parameter (maximum 2 bits) included in the DCI. The number of bits of the new parameter may be configured based on other configurations (DMRS symbol pattern, PUSCH mapping type, frequency hopping configuration, etc.).

More specifically, when the new parameter is configured as "00", the DMRS is transmitted at the OFDM symbol position $l_0$ of the first DMRS configured in the RRC signaling regardless of the number of symbols of the PUSCH or PDSCH allocated to one slot. When the new parameter is configured to "01", "10", or "11", the position of the OFDM symbol to which the DMRS is transmitted may be changed in association with the PUSCH mapping type determined via RRC signaling, the number of symbols of a PUSCH allocated to one slot determined by L1 signaling, and whether frequency hopping is performed.

Specifically, in the case of the DMRS 1 symbol pattern, the PUSCH mapping type A, and the frequency hopping is not configured, the new parameter is configured as 2 bits in the DCI, and the number of OFDM symbols and the transmission position of the DRS are determined according to the configuration value of 2 bits as shown in Table 8 below. In table 8 below, 0 is a position of a first OFDM symbol of DMRS configured via higher signaling (RRC signaling) in a time resource for transmitting a PUSCH. For example, when $l_0=0$, DMRS is transmitted in the first OFDM symbol among the OFDM symbols configured for PUSCH transmission. Specifically, when $l_0=3$, the new parameter is configured as "01", and the number of OFDM symbols configured for PUSCH transmission is 11, as the symbol positions of the DMRS are determined to be 3 and 9, based on the following table, the DMRS is transmitted in the 4$^{th}$ and 10$^{th}$ OFDM symbols among the OFDM symbols configured for PUSCH transmission.

TABLE 8

| Duration in symbols | OFDM symbol position of DM-RS New parameter with 2-bits in DCI | | | |
| --- | --- | --- | --- | --- |
| | 00 | 01 | 10 | 11 |
| <4 | — | — | — | — |
| 4 | $l_0$ | $l_0$ | $l_0$ | $l_0$ |
| 5 | $l_0$ | $l_0$ | $l_0$ | $l_0$ |
| 6 | $l_0$ | $l_0$ | $l_0$ | $l_0$ |
| 7 | $l_0$ | $l_0$ | $l_0$ | $l_0$ |
| 8 | $l_0$ | $l_0, 7$ | $l_0, 7$ | $l_0, 7$ |
| 9 | $l_0$ | $l_0, 7$ | $l_0, 7$ | $l_0, 7$ |
| 10 | $l_0$ | $l_0, 9$ | $l_0, 6, 9$ | $l_0, 6, 9$ |
| 11 | $l_0$ | $l_0, 9$ | $l_0, 6, 9$ | $l_0, 6, 9$ |
| 12 | $l_0$ | $l_0, 9$ | $l_0, 6, 9$ | $l_0, 5, 8, 11$ |
| 13 | $l_0$ | $l_0, 11$ | $l_0, 7, 11$ | $l_0, 5, 8, 11$ |
| 14 | $l_0$ | $l_0, 11$ | $l_0, 7, 11$ | $l_0, 5, 8, 11$ |

In the case of DMRS 1 symbol pattern, PUSCH mapping type B, and frequency hopping being not configured, the new parameter of DCI is set to 2 bits, and the number and transmission position of OFDM symbols of DMRS are determined as shown in Table 9 below.

TABLE 9

| Duration in symbols | OFDM symbol position of DM-RS New parameter with 2-bits in DCI | | | |
| --- | --- | --- | --- | --- |
| | 00 | 01 | 10 | 11 |
| <4 | $l_0$ | $l_0$ | $l_0$ | $l_0$ |
| 4 | $l_0$ | $l_0$ | $l_0$ | $l_0$ |
| 5 | $l_0$ | $l_0, 4$ | $l_0, 4$ | $l_0, 4$ |
| 6 | $l_0$ | $l_0, 4$ | $l_0, 4$ | $l_0, 4$ |
| 7 | $l_0$ | $l_0, 4$ | $l_0, 4$ | $l_0, 4$ |
| 8 | $l_0$ | $l_0, 6$ | $l_0, 3, 6$ | $l_0, 3, 6$ |
| 9 | $l_0$ | $l_0, 6$ | $l_0, 3, 6$ | $l_0, 3, 6$ |
| 10 | $l_0$ | $l_0, 8$ | $l_0, 4, 8$ | $l_0, 3, 6, 9$ |
| 11 | $l_0$ | $l_0, 8$ | $l_0, 4, 8$ | $l_0, 3, 6, 9$ |
| 12 | $l_0$ | $l_0, 10$ | $l_0, 5, 10$ | $l_0, 3, 6, 9$ |
| 13 | $l_0$ | $l_0, 10$ | $l_0, 5, 10$ | $l_0, 3, 6, 9$ |
| 14 | $l_0$ | $l_0, 10$ | $l_0, 5, 10$ | $l_0, 3, 6, 9$ |

In the case of DMRS 2 symbol pattern, PUSCH mapping type A, and frequency hopping is not configured, the new parameter of DCI is configured as 1 bit, and the number and transmission position of OFDM symbols of DMRS are determined as shown in Table 10 below.

TABLE 10

| Duration in symbols | OFDM symbol position of DM-RS New parameter with 2-bits in DCI | |
| --- | --- | --- |
| | 0 | 1 |
| <4 | — | — |
| 4 | $l_0$ | $l_0$ |
| 5 | $l_0$ | $l_0$ |

TABLE 10-continued

| Duration in symbols | OFDM symbol position of DM-RS New parameter with 2-bits in DCI | |
|---|---|---|
| | 0 | 1 |
| 6 | $1_0$ | $1_0$ |
| 7 | $1_0$ | $1_0$ |
| 8 | $1_0$ | $1_0$ |
| 9 | $1_0$ | $1_0$ |
| 10 | $1_0$ | $1_0$, 8 |
| 11 | $1_0$ | $1_0$, 8 |
| 12 | $1_0$ | $1_0$, 8 |
| 13 | $1_0$ | $1_0$, 10 |
| 14 | $1_0$ | $1_0$, 10 |

In the case of DMRS 2 symbol pattern, PUSCH mapping type B, and frequency hopping is not configured, the new parameter of DCI is configured as 1 bit, and the number and transmission position of OFDM symbols of DMRS are determined as shown in Table 11 below.

TABLE 11

| Duration in symbols | OFDM symbol position of DM-RS New parameter with 1 bit in DCI | |
|---|---|---|
| | 0 | 1 |
| <4 | — | — |
| 4 | $1_0$ | $1_0$ |
| 5 | $1_0$ | $1_0$ |
| 6 | $1_0$ | $1_0$ |
| 7 | $1_0$ | $1_0$ |
| 8 | $1_0$ | $1_0$, 5 |
| 9 | $1_0$ | $1_0$, 5 |
| 10 | $1_0$ | $1_0$, 7 |
| 11 | $1_0$ | $1_0$, 7 |
| 12 | $1_0$ | $1_0$, 9 |
| 13 | $1_0$ | $1_0$, 9 |
| 14 | $1_0$ | $1_0$, 9 |

In the case of DMRS 1 symbol pattern, PUSCH mapping type A, and frequency hopping is configured, the new parameter of DCI is configured as 1 bit, and the number and transmission position of OFDM symbols of DMRS are determined as shown in Table 12 below.

TABLE 12

| Duration in symbols | OFDM symbol position of DM-RS New parameter with 1 bit in DCI | | | | | | | |
|---|---|---|---|---|---|---|---|---|
| | $1_0 = 2$ | | | | $1_0 = 3$ | | | |
| | 0 | | 1 | | 0 | | 1 | |
| | 1st hop | 2nd hop | 1st hop | 2nd hop | 1st hop | 2nd hop | 1st hop | 2nd hop |
| <3 | — | — | — | — | — | — | — | — |
| 4 | $1_0$ | 0 | $1_0$ | 0 | $1_0$ | 0 | $1_0$ | 0 |
| 5, 6 | $1_0$ | 0 | $1_0$ | 0, 4 | $1_0$ | 0 | $1_0$ | 0, 4 |
| 7 | $1_0$ | 0 | $1_0$, 6 | 0, 4 | $1_0$ | 0 | $1_0$ | 0, 4 |

In the case of DMRS 1 symbol pattern, PUSCH mapping type B, and frequency hopping is configured, the new parameter of DCI is configured as 1 bit, and the number and transmission position of OFDM symbols of DMRS are determined as shown in Table 13 below.

TABLE 13

| Duration in symbols | OFDM symbol position of DM-RS New parameter with 1-bit in DCI | | | |
|---|---|---|---|---|
| | 0 | | 1 | |
| | 1st hop | 2nd hop | 1st hop | 2nd hop |
| <3 | $1_0$ | $1_0$ | $1_0$ | $1_0$ |
| 4 | $1_0$ | $1_0$ | $1_0$ | $1_0$ |
| 5, 6 | $1_0$ | $1_0$ | $1_0$, 4 | $1_0$, 4 |
| 7 | $1_0$ | $1_0$ | $1_0$, 4 | $1_0$, 4 |

The method is simple and clear because it explicitly configures the number of DMRS OFDM symbols, and by adding new parameters, the total number of bits of the DCI can be increased to increase the DCI overhead.

Method 2

Since method 1 uses a maximum of 2 bits, the overhead of DCI increases, and thus, a method of reducing the overhead of DCI increasing via a maximum of 1 bit is proposed.

When dynamically changing the number of OFDM symbols of DMRS, one value of the number of OFDM symbols preconfigured via RRC signaling may be selected via 1 bit of DCI. This method may be disadvantageous for DMRS optimization but may reduce the overhead of DCI.

According to method 2, since only 1 bit is required to indicate the number and position of the symbols of DMRS in the environment corresponding to Tables 10, 11, 12 and 13 in the above-described method 1, it can be matched as it is. In the case of Tables 8 and 9, when the base station configures the number of additional OFDM symbols of the DMRS to 1 and 3, for example, via RRC signaling (these configurations can be any combination of two selected numbers from 0 to 3, for example, 0, 2 can be combined), in the case of Tables 8 and 9, when the new 1 bit of DCI is "0", this corresponds to "01" in method 1 (if the number of additional symbols in DMRS is 1), and "1" may correspond to "11" in method 1 (the number of additional symbols in DMRS is 3)

Method 3

According to the methods 1 and 2, since the total number of bits of the DCI may increase by adding a new parameter to the DCI in configuring the number of OFDM symbols of the DMRS, the overhead may increase, and thus, a method of implicitly configuring the number of symbols of DMRS, based on a parameter value existing in DCI is proposed.

Environments that require a large number of DMRS OFDM symbols generally correspond to an environment in which a terminal moves at a high speed or a terminal is located at a cell edge and thus a base station has a low reception SNR. On the contrary, even if a small number of DMRS OFDM symbols are used, an environment capable of guaranteeing the performance of signal transmission and reception corresponds to an environment in which the base station has a high reception SNR because the terminal moves at a low speed or the terminal is located at the cell center. Considering a modulation and coding scheme (MCS) value, which is one of the parameters of DCI, it is suitable for a base station to configure a high MCS index to a terminal in a high reception SNR similarly to the above environment, and it is suitable for the base station to configure a low MCS index for the terminal in a low reception SNR. Therefore, the number of OFDM symbols of the DMRS may be changed according to the MCS index among the parameters of the DCI.

Specifically, in an area where a low MCS is configured, a large number of DMRS OFDM symbols may be configured for improving channel estimation performance, and in the area where a high MCS is configured, a large number of DMRS OFDM symbols may be configured. For example, as shown in Table 14 below, the number of OFDM symbols of the DMRS is determined according to the MCS index, and the position of the DMRS symbol may be determined by a corresponding value according to each Table according to any of the above Tables 8 to 13. For example, if the MCS index is 0 and corresponds to Table 8 (DMRS is 1 symbol pattern, PUSCH mapping type A, and frequency hopping is not configured), the DMRS symbol may be configured according to the case where the value of DCI 2 bits of Table 8 is "11".

TABLE 14

| MCS index | Modulation | New parameter value defined in Tables 8 to 13 | |
|---|---|---|---|
| | | Case corresponding to one of tables 8 and 9 | Case corresponding to one of tables 10 to 13 |
| 0 | QPSK | 11 | 1 |
| ... | QPSK | 11 | 1 |
| 4 | QPSK | 11 | 1 |
| 5 | 16 QAM | 10 | 1 |
| ... | 16 QAM | 10 | 1 |
| 10 | 16 QAM | 10 | 1 |
| 11 | 64 QAM | 01 | 0 |
| ... | 64 QAM | 01 | 0 |
| 19 | 64 QAM | 01 | 0 |
| 20 | 256 QAM | 00 | 0 |
| ... | 256 QAM | 00 | 0 |
| 27 | 256 QAM | 00 | 0 |

Method 3 is not limited to the example of Table 14 above and may be in accordance with various combinations within the basic principles of Method 3.

Method 4

As in Method 3, a method of implicitly configuring the number of DMRS symbols, based on the existing parameter values of DCI, is proposed. As described above, an environment requiring a large number of DMRS OFDM symbols corresponds to an environment in which a terminal moves at a high speed or a terminal is located at a cell edge and thus a base station has a low reception SNR. In such an environment, it is more effective to increase reliability by using a lower modulation order (1 (pi/2BPSK), 2 (QPSK), 4 (16QAM), etc.) than by using a higher modulation order (e.g., 4 (16 QAM), 6 (64QAM), 8 (256QAM)) to increase the data rate.

Since the existing MCS tables include modulation orders 1, 2, 4, 6, and 8 as described above, MCS indexes (e.g., MCS indexes corresponding to modulation orders 4, 6, and 8) that are not used in the environment with low reception SNR described above are included. Therefore, it is possible to design a new MCS index table which is composed only of modulation orders 1 and 2 and is associated with the number of OFDM symbols of DMRS.

Considerations for Designing New MCS Index Table

1. Correspondence between number of OFDM symbols in DMRS and MCS index

2. Configure only with a low modulation order

For example, by designing a new MCS table, Table 15, as shown below, in which the MCS index corresponds only to modulation orders 1 and 2, can be designed.

TABLE 15

| MCS index $I_{MCS}$ | Modulation Order $Q_m$ | Target code rate $R_x$ [1024] | Spectral efficiency | Environment corresponding to one of tables 8 and 9 | Environment corresponding to one of tables 10 to 13 |
|---|---|---|---|---|---|
| 0 | 1 | 120 | 0.2344 | 11 | 1 |
| 1 | 1 | 157 | 0.3066 | 10 | 1 |
| 2 | 1 | 193 | 0.3770 | 01 | 0 |
| 3 | 1 | 251 | 0.4902 | 00 | 0 |
| 4 | 2 | 308 | 0.6016 | 11 | 1 |
| 5 | 2 | 379 | 0.7402 | 10 | 1 |
| 6 | 2 | 449 | 0.8770 | 01 | 0 |
| 7 | 2 | 526 | 1.0273 | 00 | 0 |
| 8 | 1 | 602 | 1.1758 | 11 | 1 |
| 9 | 1 | 679 | 1.3262 | 10 | 1 |
| 10 | 1 | 340 | 1.3281 | 01 | 0 |
| 11 | 1 | 378 | 1.4766 | 00 | 0 |
| 12 | 2 | 434 | 1.6953 | 11 | 1 |
| 13 | 2 | 490 | 1.9141 | 10 | 1 |
| 14 | 2 | 553 | 2.1602 | 01 | 0 |
| 15 | 2 | 616 | 2.4063 | 00 | 0 |
| 16 | 1 | 658 | 2.5703 | 11 | 1 |
| 17 | 1 | 438 | 2.5664 | 10 | 1 |
| 18 | 1 | 466 | 2.7305 | 01 | 0 |
| 19 | 1 | 517 | 3.0293 | 00 | 0 |
| 20 | 2 | 567 | 3.3223 | 11 | 1 |
| 21 | 2 | 616 | 3.6094 | 10 | 1 |
| 22 | 2 | 666 | 3.9023 | 01 | 0 |
| 23 | 2 | 719 | 4.2129 | 00 | 0 |
| 24 | 1 | 772 | 4.5234 | 11 | 1 |
| 25 | 1 | 822 | 4.8164 | 10 | 1 |
| 26 | 2 | 873 | 5.1152 | 01 | 0 |
| 27 | 2 | 910 | 5.3320 | 00 | 0 |
| 28 | 2 | 948 | 5.5547 | 11 | 1 |
| 29 | 2 | | | Reserved | |
| 30 | 4 | | | Reserved | |
| 31 | 6 | | | Reserved | |

As an additional method, since the target coding rate and spectral efficiency are different for each MCS index, a new MCS table may be designed to support a low modulation order and a large number of DMRS OFDM symbols instead of configuring a low modulation order and a large number of DMRS OFDM symbols.

Considerations for Designing New MCS Index Table

1. Correspondence between number of OFDM symbols in DMRS and MCS index

2. Configure only with a low modulation order

3. Correspondence of modulation order and number of OFDM symbols in DMRS according to various target coding rates or spectral efficiency For example, by designing a new MCS table, Table 16, as shown below, in which the MCS index corresponds only to modulation orders 1 and 2, can be designed.

TABLE 16

| MCS index $I_{MCS}$ | Modulation Order $Q_m$ | Target code rate $R_x$ [1024] | Spectral efficiency | Environment corresponding to one of tables 8 and 9 | Environment corresponding to one of tables 10 to 13 |
|---|---|---|---|---|---|
| 0 | 1 | 120 | 0.2344 | 11 | 1 |
| 1 | 2 | 157 | 0.3066 | 11 | 1 |
| 2 | 1 | 193 | 0.3770 | 10 | 0 |
| 3 | 2 | 251 | 0.4902 | 10 | 0 |
| 4 | 1 | 308 | 0.6016 | 01 | 1 |
| 5 | 2 | 379 | 0.7402 | 01 | 1 |
| 6 | 1 | 449 | 0.8770 | 00 | 0 |
| 7 | 2 | 526 | 1.0273 | 00 | 0 |
| 8 | 1 | 602 | 1.1758 | 11 | 1 |
| 9 | 2 | 679 | 1.3262 | 11 | 1 |
| 10 | 1 | 340 | 1.3281 | 10 | 0 |
| 11 | 2 | 378 | 1.4766 | 10 | 0 |

TABLE 16-continued

| MCS index $I_{MCS}$ | Modulation Order $Q_m$ | Target code rate $R_x$ [1024] | Spectral efficiency | Environment corresponding to one of tables 8 and 9 | Environment corresponding to one of tables 10 to 13 |
|---|---|---|---|---|---|
| 12 | 1 | 434 | 1.6953 | 01 | 1 |
| 13 | 2 | 490 | 1.9141 | 01 | 1 |
| 14 | 1 | 553 | 2.1602 | 00 | 0 |
| 15 | 2 | 616 | 2.4063 | 00 | 0 |
| 16 | 1 | 658 | 2.5703 | 11 | 1 |
| 17 | 2 | 438 | 2.5664 | 11 | 1 |
| 18 | 1 | 466 | 2.7305 | 10 | 0 |
| 19 | 2 | 517 | 3.0293 | 10 | 0 |
| 20 | 1 | 567 | 3.3223 | 01 | 1 |
| 21 | 2 | 616 | 3.6094 | 01 | 1 |
| 22 | 1 | 666 | 3.9023 | 00 | 0 |
| 23 | 2 | 719 | 4.2129 | 00 | 0 |
| 24 | 1 | 772 | 4.5234 | 11 | 1 |
| 25 | 2 | 822 | 4.8164 | 11 | 1 |
| 26 | 1 | 873 | 5.1152 | 10 | 0 |
| 27 | 2 | 910 | 5.3320 | 10 | 0 |
| 28 | 1 | 948 | 5.5547 | 01 | 1 |
| 29 | 2 | | | Reserved | |
| 30 | 4 | | | Reserved | |
| 31 | 6 | | | Reserved | |

In addition, it is possible to lower the modulation order of the existing MCS index table so that it can be interpreted without using a new MCS table. More specifically, when a terminal receives a different interpretation of the MCS index table via RRC signaling or DCI signaling, the terminal may interpret the modulation order of the existing MCS index table by lowering it according to a formula or a condition. In addition, if the terminal analyzes by corresponding to the number of OFDM symbols of the DMRS according to the modulation order interpreted by lowering as described above, the terminal may have the same effect as using Tables 15 and 16 even without using a new MCS index table as shown in Table 15 or Table 16 above.

Method 4 is not limited to the examples in Tables 15 and 16 above, and may be in accordance with various combinations within the basic principles of Method 4.

Figure 4A:
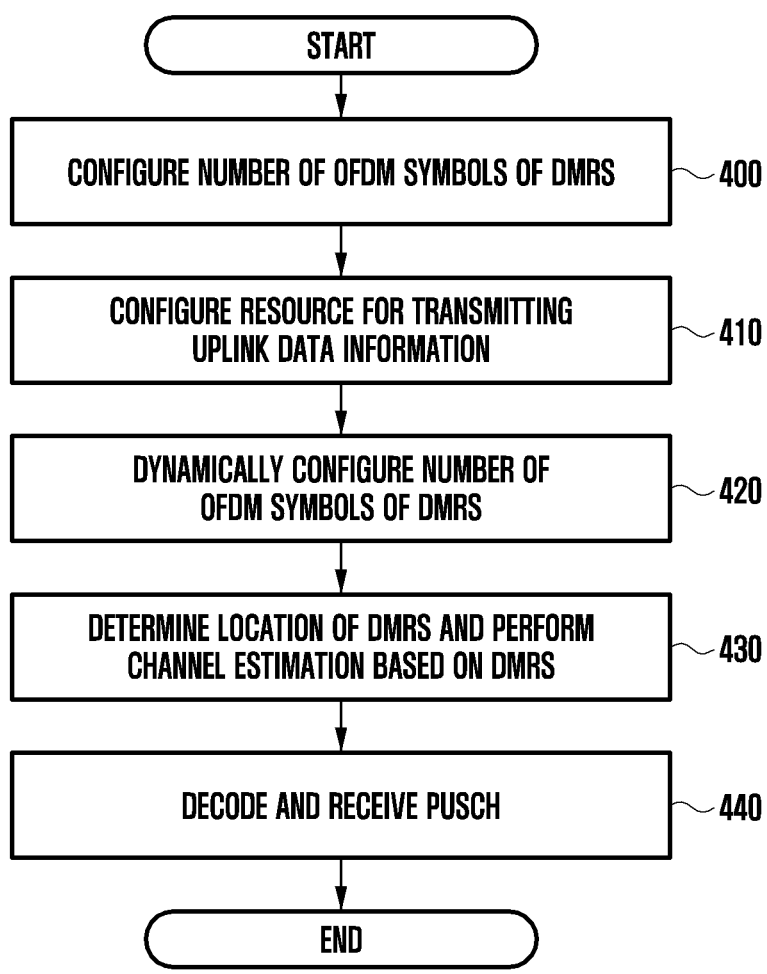
FIG. 4A is a flowchart for describing an operation of a base station according to method 1, method 2, method 3, and method 4 according to a first embodiment of the disclosure.

FIG. 4A is a flowchart for describing an operation of a base station according to the above-described first embodiment of the disclosure.

Referring to FIG. 4A, the base station may configure the number of OFDM symbols of DMRS via higher layer signaling or L1 signaling in operation 400. The base station may configure resources for PUSCH transmission via the higher layer signaling or L1 signaling in operation 410. At this time, the number of OFDM symbols of DMRS actually transmitted may be determined according to the configured number of OFDM symbols of DMRS and the resources for PUSCH transmission. Meanwhile, operations 400 and 410 have been described sequentially for convenience of description, and the operations may be performed simultaneously or the order of each operation may be changed. The base station may additionally configure the number of OFDM symbols of DMRS to a terminal dynamically via L1 signaling in operation 420.

The base station may determine the position of OFDM symbols of DMRS actually transmitted by the terminal in operation 430, and may perform channel estimation based on this. Thereafter, the base station may perform decoding and reception on uplink data transmitted on the PUSCH in operation 440.

Figure 4B:
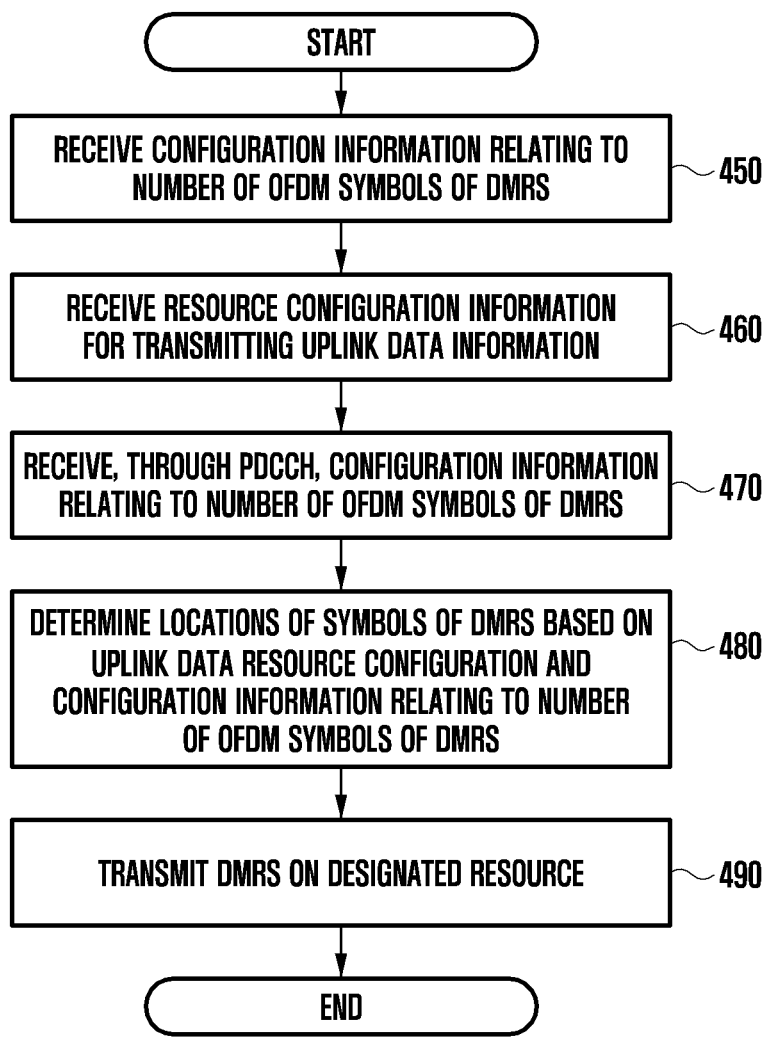
FIG. 4B is a flowchart for describing an operation of a terminal according to method 1, method 2, method 3, and method 4 according to a first embodiment of the disclosure.

FIG. 4B is a flowchart for describing an operation of a terminal according to the first embodiment of the disclosure.

Referring to FIG. 4B, the terminal may receive the OFDM symbol number configuration information of DMRS in operation 450. In operation 460, the terminal may receive resource information for transmitting uplink data information. In operation 470, the terminal may receive PDCCH (DCI) including OFDM symbol number configuration information of DMRS. The terminal may determine the number and position of OFDM symbols of DMRS, based on the OFDM symbol number configuration information of DMRS received via the PDCCH and resource information for transmitting uplink data information in operation 480. The terminal may transmit DMRS in the determined resource in operation 490.

Method 5

If a terminal exists at the cell edge or the reception SNR of the base station is low, it is necessary to dynamically change the number of DMRS OFDM symbols in order to improve the decoding performance of the data by improving the channel estimation performance. The most important factor in the following environments is the transmission power of the terminal. When the terminal exists at the cell edge or the reception SNR of the base station is low, the base station may be first configured to maximize the transmission power of the terminal.

When the reception SNR of the base station is low even if the UE uses the maximum transmission power, the base station may dynamically change the number of DMRS OFDM symbols to improve channel estimation performance and data decoding performance. The maximum use of transmission power by the UE means that a positive value is not used in the TPC command field included in the downlink control information DCI. That is, when both the base station and the terminal know that the terminal uses the maximum transmission power in the uplink, since the base station does not configure a positive TPC command field value to the terminal, this value is meaningless. Based on this, when both the terminal and the base station recognize that the terminal uses the maximum transmission power, it can implicitly inform of the number of OFDM symbols of the DMRS using the positive value of the TPC command field.

As shown in Table 17 below, the base station may implicitly inform of the number of OFDM symbols of the DMRS using a positive value of the TPC command field.

TABLE 17

| TPC Command Field | Accumulated [dB] | Absolute [dB] | If satisfying the condition # of OFDM symbols for DMRS | New parameter value defined in tables 8 to 13 Environment corresponding to one of tables 8 and 9 | Environment corresponding to one of tables 10 to 13 |
|---|---|---|---|---|---|
| 0 | −1 | −4 | — | — | — |
| 1 | 0 | −1 | — | — | — |

TABLE 17-continued

| | | | | New parameter value defined in tables 8 to 13 | |
|---|---|---|---|---|---|
| TPC Command Field | Accumulated [dB] | Absolute [dB] | If satisfying the condition # of OFDM symbols for DMRS | Environment corresponding to one of tables 8 and 9 | Environment corresponding to one of tables 10 to 13 |
| 2 | 1 | 1 | 3 | 10 | 1 |
| 3 | 3 | 4 | 4 | 11 | 1 |

Figure 5A:
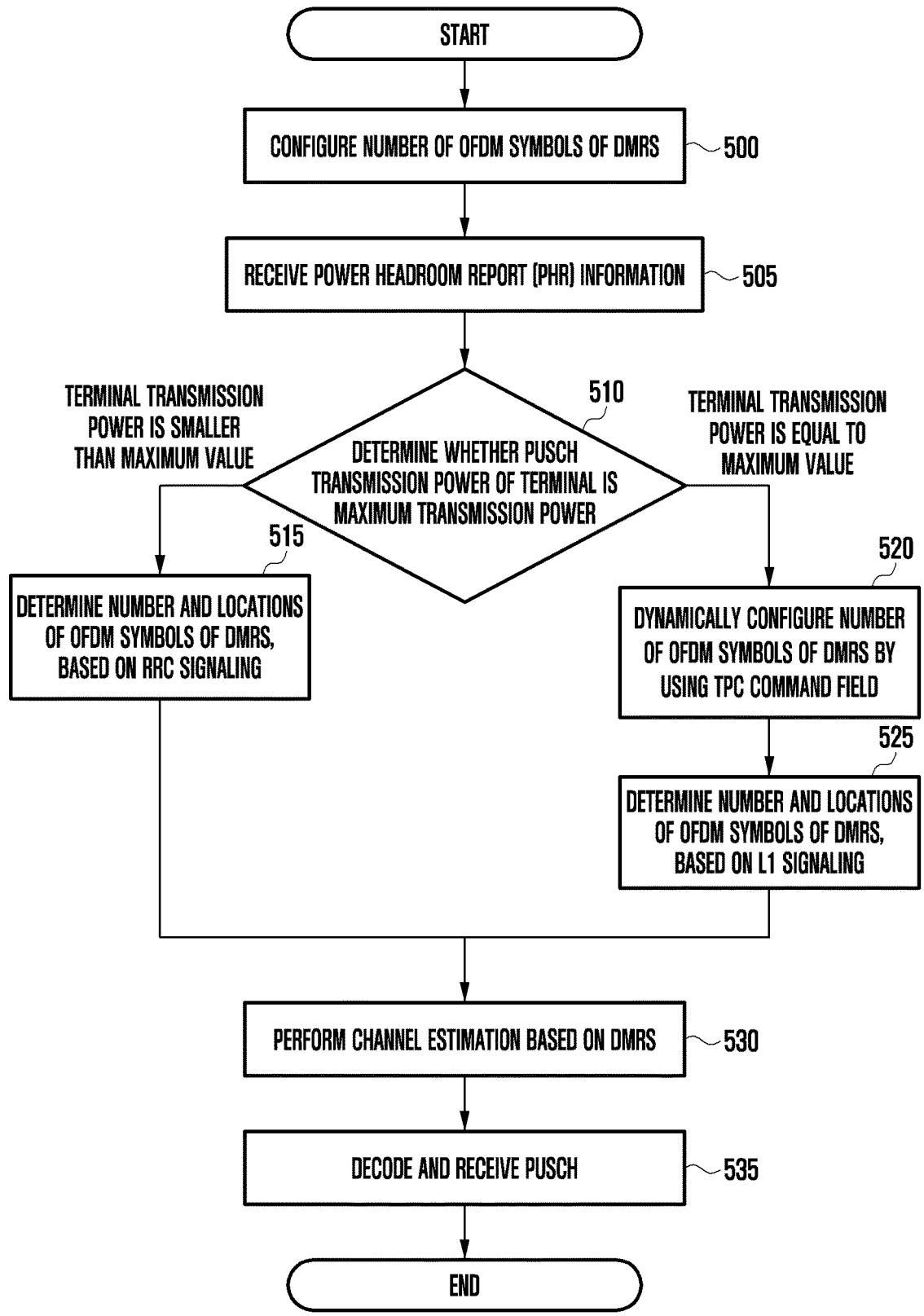
FIG. 5A is a flowchart for describing an operation of a base station to method 5 according to a first embodiment of the disclosure.

FIG. 5A is a flowchart for describing an operation of a base station according to method 5 of the first embodiment of the disclosure.

Referring to FIG. 5A, the base station may configure the number of OFDM symbols of the DMRS via higher layer signaling or L1 signaling in operation 500. The base station may receive a power headroom report from the terminal in operation 505. Meanwhile, operations 500 and 505 are described sequentially for convenience of description, and the operations may be performed simultaneously or the order of each operation may be changed. In operation 510, the base station may determine to what extent the terminal currently uses the PUSCH transmission power compared to the maximum transmission power, based on the power headroom report. When the base station determines that the terminal transmits a PUSCH with a smaller transmission power than the maximum transmission power, the base station may determine that the terminal determines the number and position of OFDM symbols of the DMRS, based on the RRC signaling and transmits the DMRS in operation 515. When the base station determines that the terminal transmits the PUSCH at the maximum transmission power, the base station configures the number of OFDM symbols of the DMRS to the terminal using the TPC command field included in the DCI in operation 520. Next, the base station determines that the terminal has determined the number and position of OFDM symbols of the DMRS via L1 signaling and has transmitted the DMRS in operation 525. In operation 530, the base station estimates a channel, based on the number and position of OFDM symbols of the DMRS determined in operation 515 or 525. Finally, the base station may perform decoding and reception on the PUSCH, based on the channel estimated in operation 535.

Figure 5B:
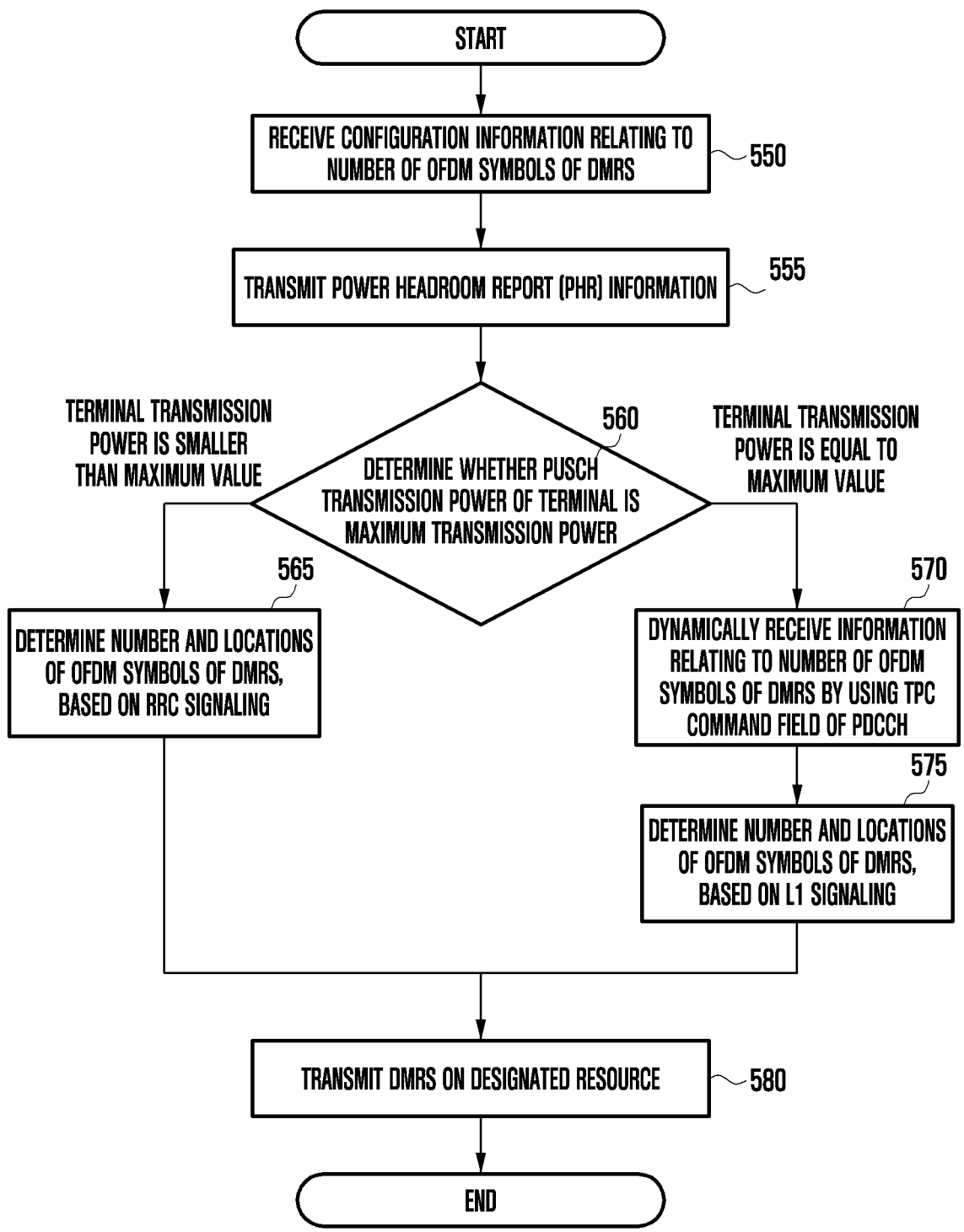
FIG. 5B is a flowchart for describing an operation of a terminal to method 5 according to a first embodiment of the disclosure.

FIG. 5B is a flowchart for describing an operation of a terminal according to method 5 of the first embodiment of the disclosure.

Referring to FIG. 5B, the terminal may receive OFDM symbol number configuration information of DMRS in operation 550. In operation 555, the terminal may transmit a power headroom report, which is a difference between the maximum transmission power of the terminal and the power configured by the base station, to the base station. Meanwhile, operations 550 and 555 are described sequentially for convenience of description, and the operations may be performed simultaneously or the order of each operation may be changed. The terminal may compare the PUSCH transmission power configured by the base station with the maximum transmission power of the terminal in operation 560. When the terminal transmits the PUSCH with less transmission power than the maximum transmission power, the terminal may identify the number and position of OFDM symbols of the DMRS via RRC signaling in operation 565. When the terminal transmits the PUSCH at the maximum transmission power, the terminal may receive the OFDM symbol number information of the DMRS using the TPC command field included in the DCI in operation 570. Next, the terminal may identify the number and position of OFDM symbols of the DMRS via L1 signaling in operation 575. Finally, in operation 580, the terminal may transmit DMRS, based on the number and position of OFDM symbols of the DMRS determined in operation 565 or 575.

Method 1, method 2, method 3, method 4, and method 5 described above may be operated in combination with each other.

According to the first embodiment of the disclosure, the UE may be dynamically configured the number of symbols of the PUSCH DMRS according to the environment, thereby improving channel estimation performance and data decoding performance.

In addition, a method of implicitly configuring the number of DMRS symbols may be always applied like methods 3 and 4 of the first embodiment, but it is more efficient to apply such a method only in an environment in which the number of OFDM symbols of the DMRS is dynamically changed. Accordingly, for methods 3 and 4, it may need to be enabled (applied only for the configured DCI) or activated (continuously until release after the configuration). This is proposed in the second embodiment.

The above methods are merely examples related to the DMRS associated with the uplink data channel PUSCH, and the method of dynamically changing the number of OFDM symbols of the DMRS is not limited to the above examples. The above methods may be applied to a downlink data channel PDSCH, an uplink control channel PUCCH, or a downlink control channel PDSCH.

Second Embodiment

Since there is an existing MCS index value, the method of implicitly indicating the number of DMRS symbols, based on the existing parameters of DCI like the methods 3 and 4 of the first embodiment described above may be more efficiently applied only in an environment in which the number of OFDM symbols of the DMRS is to be changed, rather than always applied. Accordingly, for methods 3 and 4, it may need to be enabled (applied only for the configured DCI) or activated (continuously until release after the configuration). More specifically, enabling means that the number of OFDM symbols of DMRS is changed dynamically only in the PUSCH configured by the DCI if the following conditions are met. Activation means that if the following conditions are met, the number of OFDM symbols of DMRS is dynamically changed in the PUSCH configured by all of DCI received before release.

The following methods may be considered as a method of enabling (activating) the change in the number of OFDM symbols of DMRS.

Method 1

A base station may explicitly configure whether to enable (or activate) the change in the number of uplink DMRS OFDM symbols to the terminal using a new parameter 1 bit in the DCI.

More specifically, in the case of enabling and disabling, when the new parameter is configured as "0" (disable), the terminal does not receive a DMRS OFDM symbol number via L1 signaling, or even if the terminal is configured, the terminal transmits the DMRS by determining a DMRS transmission position in a resource for PUSCH transmission, based on the number of DMRS OFDM symbols received via RRC signaling. On the contrary, when the new parameter is configured as "1" (enable), the terminal transmits DMRS by determining a DMRS transmission position in a resource for PUSCH transmission, based on the number of DMRS OFDM symbols configured via L1 signaling instead of the number of DMRS OFDM symbols received via RRC signaling.

In the case of activation and release, when the new parameter is configured as "0" (release), the terminal does not receive DMRS OFDM symbol number via L1 signaling, or even if the terminal is configured via L1 signaling, the terminal transmits the DMRS by determining a DMRS transmission position in a resource for PUSCH transmission configured by all DCI received before being activated based on the number of DMRS OFDM symbols received via RRC signaling. On the contrary, when the new parameter is configured as "1" (activation), the terminal transmits DMRS by determining a DMRS transmission position in the resource for PUSCH transmission configured by all DCI received before releasing based on the number of DMRS OFDM symbols configured via L1 signaling instead of the number of DMRS OFDM symbols received via RRC signaling.

Method 2

If a terminal exists at the cell edge or the reception SNR of a base station is low, in order to improve the decoding performance of data by improving the channel estimation performance, it is necessary to dynamically change the number of DMRS OFDM symbols. The most important factor in the following environments is the transmission power of the terminal. When the terminal exists at the cell edge or the reception SNR of a base station is low, the base station may first configure to maximize the transmission power of the terminal.

When the reception SNR of the base station is low even if the terminal uses maximum transmission power, the base station may dynamically change the number of DMRS OFDM symbols to improve channel estimation performance and data decoding performance. The maximum use of transmission power by the UE means that a positive value is not used in the TPC command field included in the downlink control information DCI. That is, when both the base station and the terminal know that the terminal uses the maximum transmission power in the uplink, since the base station does not set a positive TPC command field value to the terminal, this value is meaningless. Based on this, when both the terminal and the base station recognize that the terminal uses the maximum transmission power, it is possible to enable (or activate) the number of OFDM symbols of the DMRS through L1 signaling by using a positive value of the TPC command field.

For example, as shown in Table 18 below, the base station may enable (activate) or disable (release) the number of OFDM symbols of DMRS implicitly or explicitly configured via L1 signaling instead of the OFDM symbols of DMRS determined via RRC signaling.

TABLE 18

| TPC Command Field | Accumulated [dB] | Absolute [dB] | Enable or Disable |
| --- | --- | --- | --- |
| 0 | −1 | −4 | — |
| 1 | 0 | −1 | — |
| 2 | 1 | 1 | Disable (release) |
| 3 | 3 | 4 | Enable (activation) |

The above-described Method 1 and Method 2 may be operated in combination with each other.

Figure 6A:
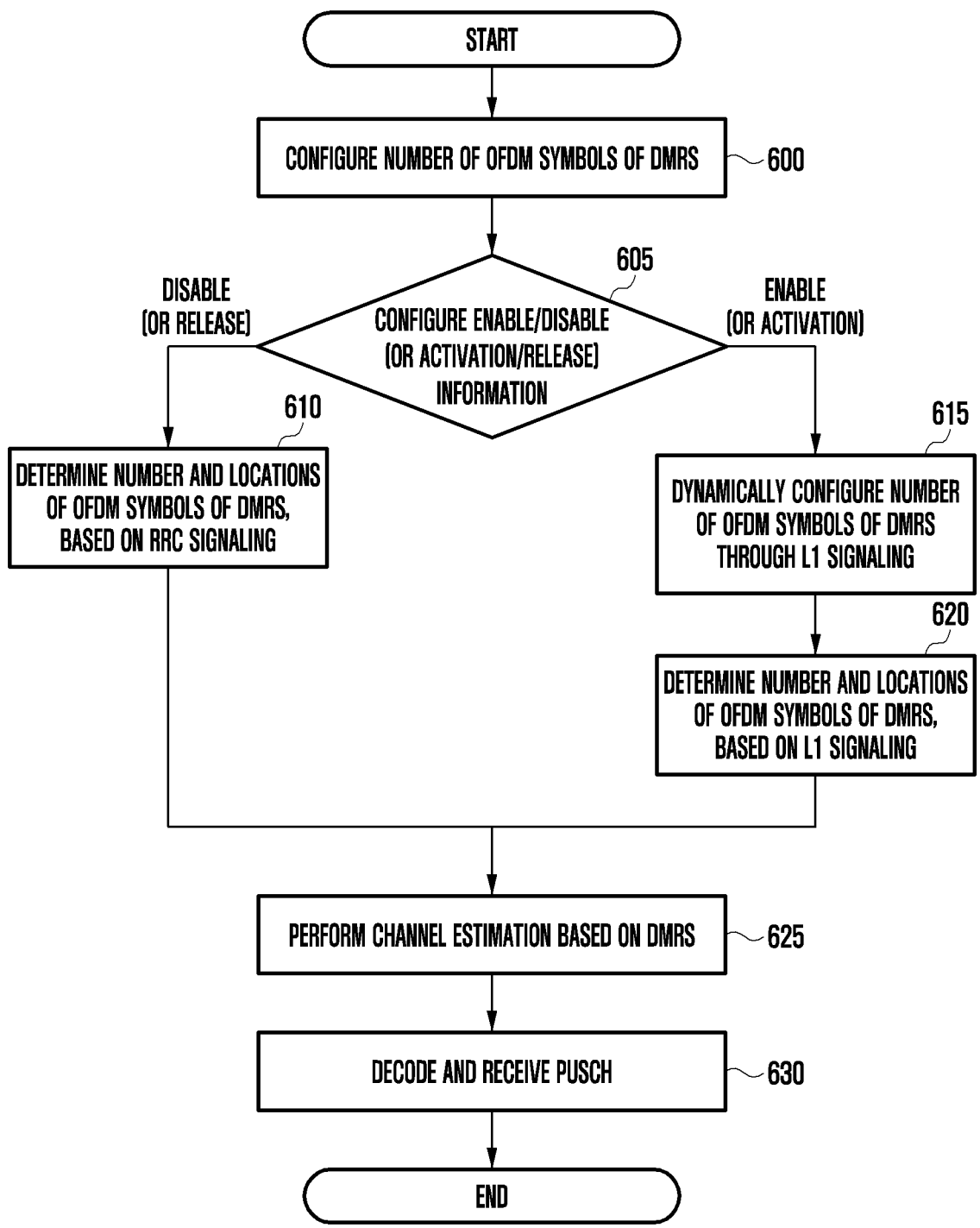
FIG. 6A is a flowchart for describing an operation of a base station according to a second embodiment of the disclosure.

FIG. 6A is a flowchart for describing an operation of a base station according to a second embodiment of the disclosure.

Referring to FIG. 6A, the base station may configure the number of OFDM symbols of DMRS via higher layer signaling or L1 signaling in operation 600. In operation 605, the base station may configure information for dynamically enabling/disabling (or activating/releasing) the OFDM symbol number change configuration of DMRS. Meanwhile, operations 600 and 605 are described sequentially for convenience of description, and the operations may be performed simultaneously or the order of each operation may be changed. If the base station is configured to dynamically disable (or release) the change in the number of OFDM symbols of DMRS in operation 605, the base station may determine that the terminal determines the number and position of OFDM symbols of DMRS via RRC signaling and transmits the DMRS in operation 610. When the base station configures the OFDM symbol number change of DMRS to be dynamically enabled (or activated) in operation 605, the base station configures the number of OFDM symbols of DMRS for the terminal implicitly, based on the new parameter included in the DCI (method 1 or method 2 of the first embodiment) or implicitly based on the existing parameters of the DCI (method 3 or method 4 of the first embodiment), in operation 615. Thereafter, in operation 620, the base station may determine that the terminal has determined the number and position of OFDM symbols of DMRS and has transmitted the DMRS via L1 signaling. In operation 625, the base station estimates a channel, based on the number and position of OFDM symbols of DMRS determined in operation 610 or 620. Finally, in operation 630, the base station may perform decoding and reception for upstream data transmitted on the PUSCH, based on the estimated channel.

Figure 6B:
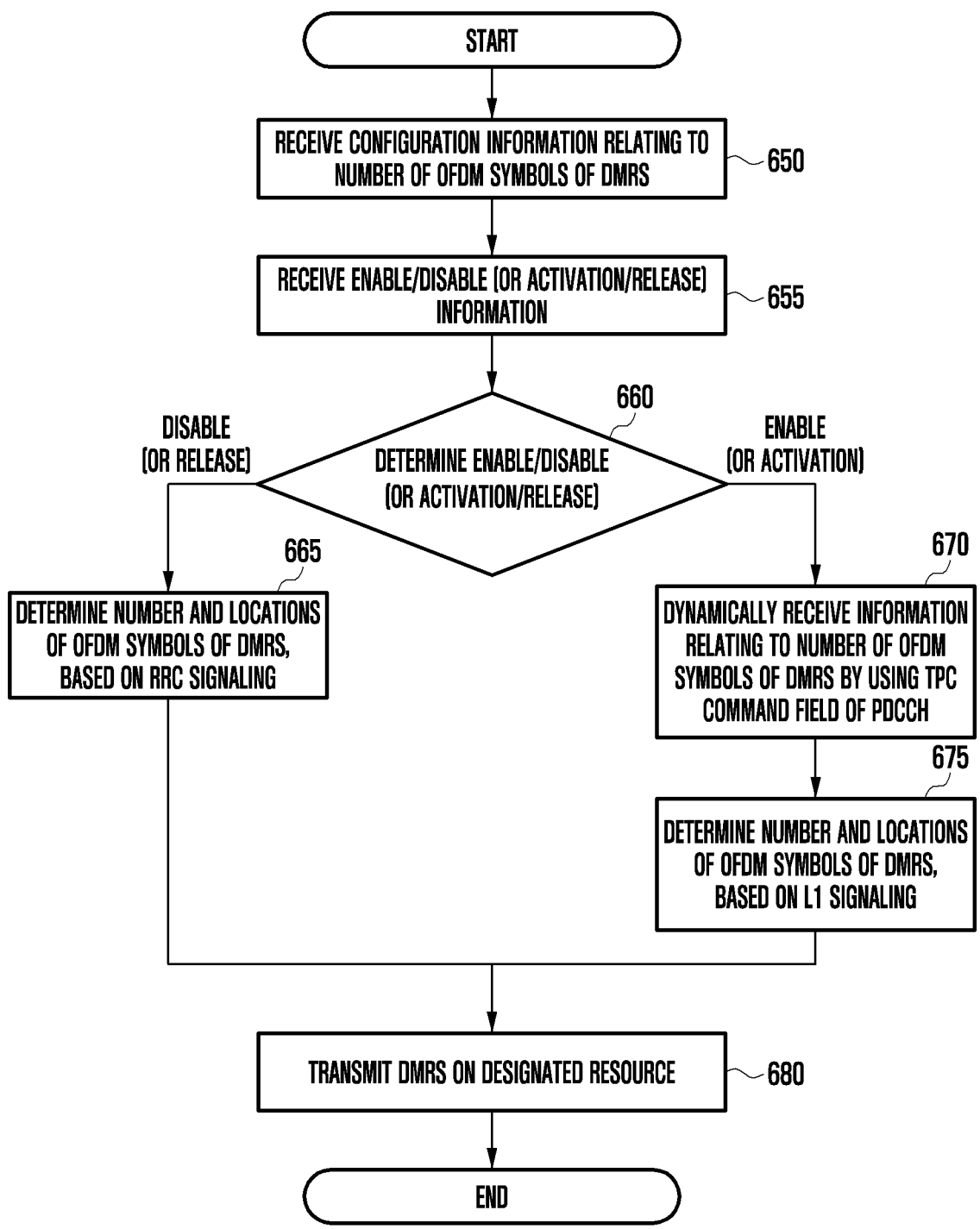
FIG. 6B is a flowchart for describing an operation of a terminal according to method according to a second embodiment of the disclosure.

FIG. 6B is a flowchart for describing an operation of a terminal according to a second embodiment of the disclosure.

Referring to FIG. 6B, in operation 650, the terminal may receive OFDM symbol number change configuration of DMRS. In operation 655, the terminal may receive information for dynamically enabling/disabling (or activating/releasing) the OFDM symbol number change configuration of DMRS. Meanwhile, operations 650 and 655 are described sequentially for convenience of description, and the operations may be performed simultaneously or the order of each operation may be changed. In operation 660, the terminal determines whether the change of the number of OFDM symbols in the DMRS is dynamically enabled/disabled (or activated/released). When the terminal determines that the change of the number of OFDM symbols of the DMRS is dynamically disabled (or released) in operation 660, the UE may check the number and position of the OFDM symbols of the DMRS via RRC signaling in operation 665. When the terminal determines that the change of the number of OFDM symbols of the DMRS is dynamically enabled (or activated) in operation 660, in operation 670, the terminal may receive and identify the OFDM symbol number information of the DMRS explicitly, based on the new parameter included in the DCI (method 1 or method 2 of the first embodiment) or implicitly, based on the existing parameter of the DCI (method 3 or method 4 of the first embodiment). Then, the terminal may determine the number and position of OFDM symbols of DMRS in operation 675. Finally, in operation 680, the terminal may transmit the DMRS, based on the number and position of OFDM symbols of the DMRS determined in operation 665 or 675.

The above methods are merely examples related to the DMRS associated with the uplink data channel PUSCH, and the method of enabling (activating) the change of the number of OFDM symbols of the DMRS is not limited to the above examples. The above methods may be applied to a DMRS such as a downlink data channel PDSCH, an uplink control channel PUCCH, or a downlink control channel PDSCH.

Third Embodiment

In the third embodiment of the disclosure, a method of configuring, by a base station, the number of OFDM symbols of DMRS, which is a reference signal in a case of retransmission, will be described. More specifically, in a low SNR or high speed environment, since the base station has a high probability of not receiving the initial transmission of the terminal, the base station may request retransmission from the terminal. The terminal determines whether to retransmit via toggling of the new data indicator value included in the DCI transmitted by the base station. For example, when the new data indicator value of the DCI scheduled for initial transmission is 1, the new data indicator value included in the DCI scheduled for retransmission is 1, and when the new data indicator value included in the DCI is 0, the DCI schedules new initial transmission.

In this case, in the case of retransmission, channel estimation performance becomes important because the reception SNR of the base station is increased by the effect similar to repetitive transmission. Therefore, in the case of retransmission, it is necessary to configure a large number of OFDM symbols to be used as DMRS to improve channel estimation performance. In this way, if the reference signal is adaptively transmitted according to the retransmission environment, the performance of signal transmission can be maximized by improving channel estimation performance. Accordingly, an embodiment of the disclosure proposes a method for configuring the number of OFDM symbols of DMRS, which is a reference signal in the case of retransmission.

The following methods may be considered as a method of configuring the number and position of OFDM symbols of DMRS.

Method 1

Unlike the initial transmission, the number of OFDM symbols of DMRS for retransmission may be semi-statically configured via higher layer signaling (RRC signaling). As described above, since the performance is improved when the number of OFDM symbols of DMRS of retransmission is different from the number of OFDM symbols of DMRS of the initial transmission according to the environment, if the new data indicator is not toggled (i.e., if the new data indicator value is the same value as that of the previous transmission), the number of OFDM symbols of DMRS may be determined, based on the configuration by higher layer signaling different from the initial transmission in order to change the number of DMRS OFDM symbols of initial transmission and retransmission. To this end, for example, the higher layer signaling for configuring the DMRS may include information on the number of OFDM symbols for retransmission, which may be, for example, information indicating the number of DMRS symbols in retransmission or information indicating a difference between the number of DMRS symbols during initial transmission and retransmission and is not limited thereto.

Method 2

The base station may explicitly configure the number of uplink DMRS OFDM symbols for retransmission to the terminal using a new parameter (e.g., up to 2 bits) included in the DCI. The value of the configured bit of the new parameter may be interpreted based on other configurations (new data indicator, DMRS symbol pattern, PUSCH mapping type, frequency hopping configuration, etc.). More specifically, if the new data indicator is not toggled (i.e., if the new data indicator is the same value as that of the previous transmission), when the new parameter is configured as "00", the DMRS is transmitted at the OFDM symbol position $l_0$ of the first DMRS configured in the RRC signaling regardless of the number of symbols of the PUSCH or PDSCH allocated to one slot. When the new parameter is configured as "01", "10", or "11", the position of the OFDM symbol to which the DMRS is transmitted may be changed in association with the PUSCH mapping type determined through RRC signaling, the number of symbols of a PUSCH allocated to one slot determined by L1 signaling, and whether frequency hopping is performed. This pointing method can be used in combination with the method of the first embodiment and/or the second embodiment described above.

Method 3

Since the method 2 uses a maximum of 2 bits, an overhead of DCI is increased, and thus a method of reducing the overhead of DCI increased via a maximum of 1 bit is proposed.

When the number of OFDM symbols of DMRS is dynamically changed in relation to retransmission, one value of the number of OFDM symbols preconfigured via RRC signaling may be selected via 1 bit of DCI. Specifically, if the new data indicator is not toggled (i.e., if the new data indicator value is the same as that of the previous transmission), a value indicated via 1 bit of DCI may be determined as the number of DMRS OFDM symbols between two values (e.g., 1 and 3) configured by the base station via RRC signaling. The value configured via the RRC signaling is only an example, and all combinations for selecting two of the numbers 0 to 3 may be configured via the RRC signaling. This indicating method may be used in combination with the method of the first embodiment and/or the second embodiment described above.

Method 4

According to the above methods 2 and 3, in configuring the number of OFDM symbols in the DMRS, by adding a new parameter to the DCI, the total number of bits in the DCI may increase, thereby increasing overhead. Therefore, a method of implicitly configuring the number of DMRS symbols of retransmission based on a parameter value existing in DCI is proposed.

An environment that requires a large number of DMRS OFDM symbols generally corresponds to an environment in which the terminal is moving at high speed or the terminal is located at the cell edge and thus the base station has a low reception SNR. On the contrary, even if a small number of DMRS OFDM symbols are used, an environment capable of guaranteeing performance corresponds to an environment in which the base station has a high reception SNR because the terminal moves at a low speed or the terminal is located at the cell center. Considering the modulation and coding scheme (MCS) value, which is one of the parameters of the DCI, it is suitable that the base station configures a high MCS index to the terminal in a high reception SNR similarly to the above environment, and the base station configures a low MCS index to the terminal in a low reception SNR. Therefore, the number of OFDM symbols of the DMRS can be changed according to the MCS index among the parameters of the DCI.

Specifically, when the new data indicator is not toggled (i.e., if the new data indicator value is the same as that of the previous transmission), a large number of DMRS OFDM symbols may be configured in an area where low MCS is configured and a large number of DMRS OFDM symbols may be configured in an area where high MCS is configured to improve channel estimation performance. This indicating method may be used in combination with the method of the first embodiment and/or the second embodiment described above.

Method 5

As in Method 4, a method of implicitly configuring the number of DMRS symbols, based on a parameter value existing in the DCI is proposed. As described above, an environment requiring a large number of DMRS OFDM symbols corresponds to an environment in which a mobile terminal moves at a high speed or a mobile terminal is located at a cell edge and thus a base station has a low reception SNR. In such an environment, it is more effective to increase reliability by using a lower modulation order (e.g., 1 (pi/2 BPSK), 2 (QPSK)), 4 (16QAM), etc.) than to increase the data rate by using higher modulation order (e.g., 4 (16 QAM), 6 (64QAM), 8 (256QAM)).

Since the existing MCS tables include Modulation orders 1, 2, 4, 6, and 8 as described above, many MCS indexes (e.g., MCS indexes corresponding to modulation orders 4, 6, and 8) that are not used in the environment with low reception SNR described above are included. Therefore, it is possible to design a new MCS index table which is composed only of modulation orders 1 and 2 and is associated with the number of OFDM symbols of DMRS.

Considerations for Designing a New MCS Index Table
1. Correspondence between number of OFDM symbols in DMRS and MCS index
2. Configure only with low modulation order In addition, since the target coding rate and spectral efficiency are different for each MCS index, not only a low modulation order and a large number of DMRS OFDM symbols are configured, but also a new MCS table that combines a low modulation order and various numbers of DMRS OFDM symbols may be designed.

Considerations for Designing a New MCS Index Table
1. Correspondence between number of OFDM symbols in DMRS and MCS index
2. Configure only with low modulation order
3. Correspondence of modulation order and number of OFDM symbols in DMRS according to various target coding rates or spectral efficiency In addition, without using a new MCS table, it is possible to lower the modulation order of the existing MCS index table to be interpreted. More specifically, when the terminal receives a configuration for interpreting the MCS index table differently via RRC signaling or DCI signaling, the terminal may interpret by lowering the modulation order of the existing MCS index table in accordance with an equation or a condition. In addition, the terminal may correspond to the number of OFDM symbols of the DMRS according to the modulation order lowered as described above.

Therefore, when the new data indicator is not toggled (i.e., if the new data indicator is the same as that of the previous transmission), the new MCS index table may be referred to, but on the contrary, when the new data indicator is toggled (i.e., if the new data indicator is different from that of the previous transmission), the existing MCS index table may be referred to. This indicating method may be used in combination with the method of the first embodiment and/or the second embodiment described above. That is, the new MCS index table may be Table 15 or 16.

Method 6

If the terminal is at the cell edge or the reception SNR of the base station is low, it is necessary to dynamically change the number of DMRS OFDM symbols in order to improve the decoding performance of the data by improving the channel estimation performance. The most important factor in the following environments is the transmission power of the terminal. When the terminal exists at the cell edge or the reception SNR of the base station is low, the base station may be configured to use the maximum transmission power of the terminal in the initial transmission.

Even if the terminal uses maximum transmission power, when the reception SNR of the base station is low, the base station may dynamically change the number of DMRS OFDM symbols to improve channel estimation performance and data decoding performance. If the terminal fails to decode the data in the initial transmission, the maximum use of the transmission power means that a positive value is not used in the TPC command field included in the downlink control information DCI for retransmission. That is, when both the base station and the terminal know that the terminal uses the maximum transmission power in the uplink, since the base station does not configure a positive TPC command field value to the terminal, this value is meaningless. Based on this, if both the terminal and the base station know that the terminal uses the maximum transmission power and the new data indicator is not toggled (i.e., if the new data indicator value is the same as that of the previous transmission and), it can implicitly inform of the number of OFDM symbols of the DMRS using the positive value of the TPC command field.

Method 1, method 2, method 3, method 4, method 5, and method 6 described above may be operated in combination with each other.

In addition, although the method of implicitly configuring the number of DMRS symbols can be always applied like in the methods 4 and 5 of the third embodiment, it is more efficient to apply such a method only in an environment in which the number of OFDM symbols of the DMRS is dynamically changed. Therefore, in a case of methods 4 and 5, a method of enabling (applying only to configured DCI) or activating (continually applying before release after configuring) may be needed. The method proposed in the second embodiment described above can be applied to this.

The above methods are merely examples related to the DMRS associated with the uplink data channel PUSCH retransmission, and the method of dynamically changing the number of OFDM symbols of the DMRS is not limited to the above example, but may be applied to the PDSCH retransmission, which is a downlink data channel.

Figure 7:
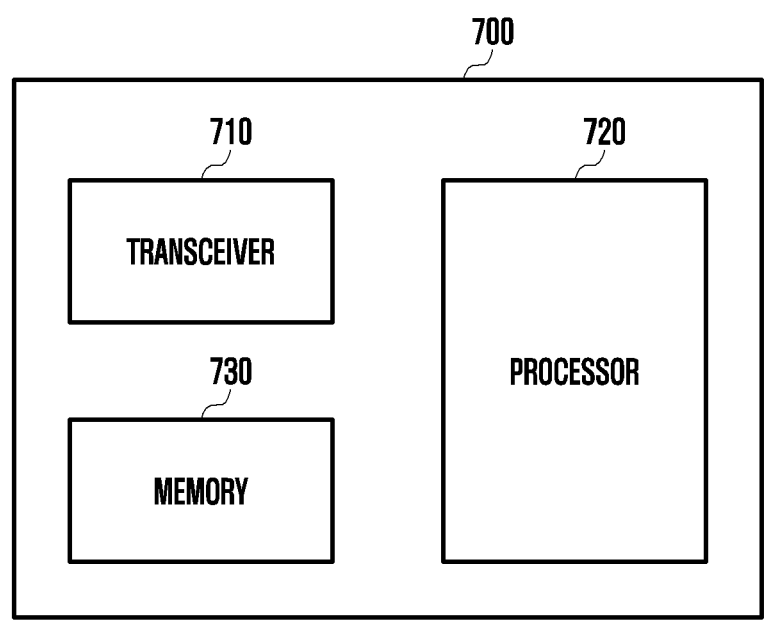
FIG. 7 is a block diagram of a terminal according to an embodiment of the disclosure.

FIG. 7 is a block diagram of a terminal 700 according to an embodiment of the disclosure.

Referring to FIG. 7, the terminal 700 may include a transceiver 710, a processor 720, and a memory 730. In the 5G communication system corresponding to the above-described embodiment, the transceiver 710, the processor 720, and the memory 730 of the terminal 700 may operate. However, the components of the terminal 700 according to an embodiment are not limited to the above-described example. According to another embodiment, the terminal 700 may include more components or fewer components than the aforementioned components. In addition, in certain cases, the transceiver 710, the processor 720, and the memory 730 may be implemented in a single chip form.

The transceiver 710 may be configured as a transmitter and a receiver according to another embodiment. The transceiver 710 may transmit and receive a signal with the base station. The signal may include control information and data. To this end, the transceiver 710 may be configured as an RF transmitter for up-converting and amplifying the frequency of the transmitted signal, and an RF receiver for low noise amplifying and down-converting the received signal. In addition, the transceiver 710 may receive a signal through a wireless channel, output the signal to the processor 720, and transmit a signal output from the processor 720 through the wireless channel.

The processor 720 may control a series of processes in which the terminal 700 may operate according to the above-described embodiments of the disclosure. For example, the processor 720 may differently control the method of configuring a DMRS that is a reference signal according to an embodiment of the disclosure, that is, a method of configuring the number and position of OFDM symbols of a DMRS, a method of enabling a change of the number of OFDM symbols of a DMRS, and the like.

The memory 730 may store control information or data such as information on the number of OFDM symbols of the DMRS included in the signal obtained from the terminal 700 and may have an area for storing data necessary for the control of the processor 720 and data generated during the control in the processor 720.

Figure 8:
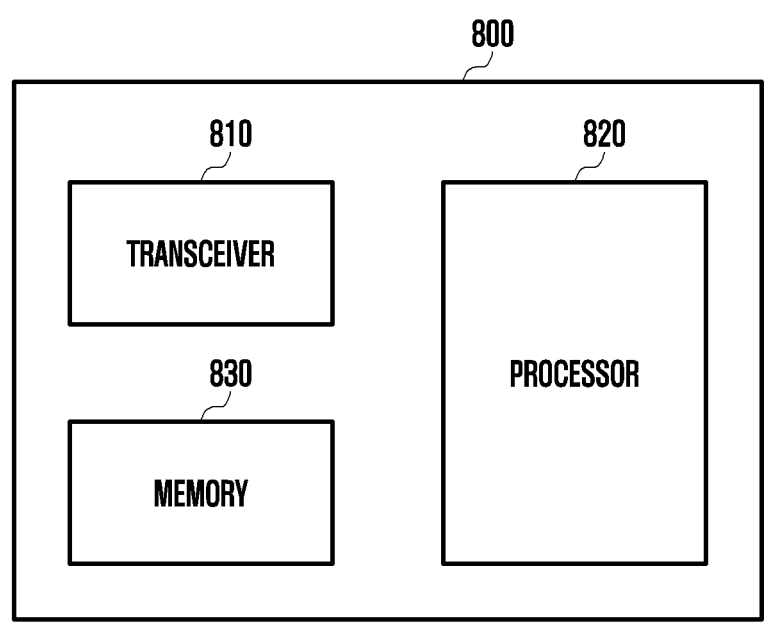
FIG. 8 is a block diagram of a base station according to an embodiment of the disclosure.

FIG. 8 is a block diagram of a base station 800 according to an embodiment of the disclosure. Referring to FIG. 8, the base station 800 may include a transceiver 810, a processor 820, and a memory 830. According to the method of configuring the DMRS which is a reference signal in the 5G communication system according to the above-described embodiment, the transceiver 810, the processor 820, and the memory 830 of the base station 800 may operate. However, the components of the base station 800 according to an embodiment are not limited to the above-described example. According to another embodiment, the base station 800 may include more components or fewer components than the aforementioned components. In addition, in certain cases, the transceiver 810, the processor 820, and the memory 830 may be implemented in a single chip form. The transceiver 810 may be configured as a transmitter and a receiver according to another embodiment. The transceiver 810 may transmit and receive a signal with the terminal. The signal may include control information and data. To this end, the transceiver 810 may be configured as an RF transmitter for up-converting and amplifying a frequency of a transmitted signal, and an RF receiver for low noise amplifying and down-converting a received signal. In addition, the transceiver 810 may receive a signal through a wireless channel, output the signal to the processor 820, and transmit a signal output from the processor 820 through a wireless channel.

The processor 820 may control a series of processes such that the base station 800 may operate according to the above-described embodiment of the disclosure. For example, the processor 820 may differently control a method of configuring a DMRS that is a reference signal, that is, a method of determining the number and position of OFDM symbols of a DMRS, a method of determining the enable of a change of the number of OFDM symbols of a DMRS, and the like.

The memory 830 may store control information such as information on the number of OFDM symbols of DMRS determined by the base station 800, data or control information received from the terminal, and may have an area for storing data necessary for the control of the processor 820 and data generated in the processor 820 during control.

The disclosure relates to a communication method and system for converging a 5th-Generation (5G) communication system for supporting higher data rates beyond a 4th-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. The disclosure discloses a method and an apparatus for dynamically or quasi-statically configuring a demodulation reference signal (DMRS), either explicitly or implicitly.

While the disclosure has been shown described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a communication system, the method comprising:
    receiving, from a base station, a radio resource control (RRC) message including first information indicating a first number of at least one symbol for a demodulation reference signal (DMRS) and a first position for each of the at least one symbol;
    receiving, from the base station, downlink control information (DCI) for scheduling a physical uplink shared channel (PUSCH), the DCI including second information used to change the first number and the first position and third information for resource allocation of the PUSCH;
    identifying, based on the second information and the third information, a second number of the at least one symbol changed from the first number and a second position for each of the at least one symbol changed from the first position; and
    transmitting, to the base station, the DMRS with the PUSCH based on the second position for each of the at least one symbol.

2. The method of claim 1, wherein the second number of the at least one symbol and the second position for each of the at least one symbol is further identified based on at least one of a mapping type of the PUSCH, frequency hopping configuration of the PUSCH, or a pattern of the DMRS.

3. The method of claim 1,
    wherein the DCI further includes information indicating whether a change in the first number of the at least one symbol is enabled.

4. The method of claim 3, further comprising:
    in case that the information indicates that the change in the first number of the at least one symbol is disabled, transmitting, to the base station, the DMRS with the PUSCH based on the first position for each of the at least one symbol.

5. A method performed by a base station in a communication system, the method comprising:
transmitting, to a terminal, a radio resource control (RRC) message including first information indicating a first number of at least one symbol for a demodulation reference signal (DMRS) and a first position for each of the at least one symbol;
transmitting, to the terminal, downlink control information (DCI) for scheduling a physical uplink shared channel (PUSCH), the DCI including second information used to change the first number and the first position and third information for resource allocation of the PUSCH, wherein a second number of the at least one symbol changed from the first number and a second position for each of the at least one symbol changed from the first position are identified based on the second information and the third information; and
receiving, from the terminal, the DMRS with the PUSCH based on the second position for each of the at least one symbol.

6. The method of claim 5, wherein the second number of the at least one symbol and the second position for each of the at least one symbol are further identified based on at least one of a mapping type of the PUSCH, frequency hopping configuration of the PUSCH, or a pattern of the DMRS.

7. The method of claim 5,
wherein the DCI further includes information indicating whether a change in the first number of the at least one symbol is enabled.

8. The method of claim 7, further comprising:
in case that the information indicates that the change in the first number of the at least one symbol is disabled,
receiving, from the terminal, the DMRS with the PUSCH based on the first position for each of the at least one symbol.

9. A terminal in a communication system, the terminal comprising:
a transceiver; and
at least one processor configured to:
receive, from a base station via the transceiver, a radio resource control (RRC) message including first information indicating a first number of at least one symbol for a demodulation reference signal (DMRS) and a first position for each of the at least one symbol,
receive, from the base station via the transceiver, downlink control information (DCI) for scheduling a physical uplink shared channel (PUSCH), the DCI including second information used to change the first number and the first position and third information for resource allocation of the PUSCH,
identify, based on the second information and the third information, a second number of the at least one symbol changed from the first number and a second position for each of the at least one symbol changed from the first position, and transmit, to the base station via the transceiver, the DMRS with the PUSCH based on the second position for each of the at least one symbol.

10. The terminal of claim 9, wherein the second number of the at least one symbol and the second position for each of the at least one symbol is further identified based on at least one of a mapping type of the PUSCH, frequency hopping configuration of the PUSCH, or a pattern of the DMRS.

11. The terminal of claim 9, wherein the DCI further includes information indicating whether a change in the first number of the at least one symbol is enabled.

12. The terminal of claim 11, wherein the at least one processor is further configured to:
in case that the information indicates that the change in the first number of the at least one symbol is disabled,
transmit, to the base station via the transceiver, the DMRS with the PUSCH based on the first position for each of the at least one symbol.

13. A base station in a communication system, the base station comprising:
a transceiver; and
at least one processor configured to:
transmit, to a terminal via the transceiver, a radio resource control (RRC) message including first information indicating a first number of at least one symbol for a demodulation reference signal (DMRS) and a first position for each of the at least one symbol,
transmit, to the terminal via the transceiver, downlink control information (DCI) for scheduling a physical uplink shared channel (PUSCH), the DCI including second information used to change the first number and the first position and third information for resource allocation of the PUSCH, wherein a second number of the at least one symbol changed from the first number and a second position for each of the at least one symbol changed from the first position are identified based on the second information and the third information, and
receive, from the terminal via the transceiver, the DMRS with the PUSCH based on the second position for each of the at least one symbol.

14. The base station of claim 13, wherein the second number of the at least one symbol and the second position for each of the at least one symbol are further identified based on at least one of a mapping type of the PUSCH, frequency hopping configuration of the PUSCH, or a pattern of the DMRS.

15. The base station of claim 13, wherein the DCI further includes information indicating whether a change in the first number of the at least one symbol is enabled.

16. The base station of claim 15,
wherein the at least one processor is further configured to:
in case that the information indicates that the change in the first number of the at least one symbol is disabled,
receive, from the terminal via the transceiver, the DMRS with the PUSCH based on the first position for each of the at least one symbol.

* * * * *